US012775275B2

(12) United States Patent
Chan et al.

(10) Patent No.: US 12,775,275 B2
(45) **Date of Patent: *Oct. 27, 2026**

(54) METHODS OF, AND APPARATUSES FOR, CONTROLLING AT LEAST ONE TRIM TAB OF A MARINE VESSEL

(71) Applicant: Dometic Marine Canada Inc., Richmond (CA)

(72) Inventors: Anson Chin Pang Chan, Richmond (CA); Andrew Joseph Kang, Vancouver (CA)

(73) Assignee: Dometic Marine Canada Inc., Richmond (CA)

( * ) Notice: Subject to any disclaimer, the term of this patent is extended or adjusted under 35 U.S.C. 154(b) by 41 days.

This patent is subject to a terminal disclaimer.

(21) Appl. No.: 18/920,082

(22) Filed: Oct. 18, 2024

(65) Prior Publication Data

US 2025/0044801 A1 Feb. 6, 2025

Related U.S. Application Data

(63) Continuation of application No. 17/724,061, filed on Apr. 19, 2022, now Pat. No. 12,124,276.

(60) Provisional application No. 63/176,794, filed on Apr. 19, 2021.

(51) Int. Cl.

| | |
|---|---|
| ***G05D 1/00*** | (2024.01) |
| ***B63B 1/30*** | (2006.01) |
| ***G05D 1/49*** | (2024.01) |

(52) U.S. Cl.

CPC ............. *G05D 1/0875* (2013.01); *B63B 1/30* (2013.01); *G05D 1/49* (2024.01)

(58) Field of Classification Search

CPC .......... G05D 1/0875; G05D 1/49; B63B 1/30; B63B 39/061; B63H 21/213

See application file for complete search history.

(56) References Cited

U.S. PATENT DOCUMENTS

| | | | | |
|---|---|---|---|---|
| 5,263,432 | A | 11/1993 | Davis | |
| 5,385,110 | A | 1/1995 | Bennett et al. | |
| D362,841 | S | 10/1995 | Roza | |
| 5,474,012 | A | 12/1995 | Yamada | |
| 6,041,730 | A | 3/2000 | Oliverio | |
| 6,354,237 | B1 * | 3/2002 | Gaynor | B63B 39/061 114/286 |
| 6,417,469 | B1 | 7/2002 | Tamura | |

(Continued)

FOREIGN PATENT DOCUMENTS

| | | | |
|---|---|---|---|
| JP | S6444396 | A | 2/1989 |
| JP | 2858133 | B2 | 2/1999 |

(Continued)

OTHER PUBLICATIONS

Multifunction Displays & Combos, downloaded from https://web.archive.org/web/20210123110930/https:/www.westmarine.com/multifunction-displays-combos/and dated Jan. 23, 2021 by web.archive.org.

(Continued)

*Primary Examiner* — Anne Marie Antonucci
*Assistant Examiner* — Misa H Nguyen
(74) *Attorney, Agent, or Firm* — CALDERON SAFRAN & WRIGHT P.C.

(57) ABSTRACT

Methods of, and apparatuses for, controlling at least one trim tab of a marine vessel are disclose.

20 Claims, 19 Drawing Sheets

(56) References Cited

U.S. PATENT DOCUMENTS

| | | | |
|---|---|---|---|
| 6,659,816 | B2 | 12/2003 | Fuse |
| 6,874,441 | B2 | 4/2005 | Pigeon |
| D507,543 | S | 7/2005 | Ishii et al. |
| 7,278,367 | B1 | 10/2007 | Gonring et al. |
| 7,285,738 | B2 | 10/2007 | Lavigne et al. |
| 7,311,058 | B1 | 12/2007 | Brooks et al. |
| 7,479,607 | B2 | 1/2009 | Sack et al. |
| 7,958,837 | B1 | 6/2011 | Fraleigh |
| D654,880 | S | 2/2012 | Lam |
| 8,261,682 | B1 | 9/2012 | DeVito |
| 8,264,338 | B2 | 9/2012 | Leon |
| 8,550,023 | B1 | 10/2013 | Quail |
| D720,305 | S | 12/2014 | Wenji |
| D725,050 | S | 3/2015 | Tsugawa et al. |
| D725,612 | S | 3/2015 | Schlegel et al. |
| 9,278,740 | B1 * | 3/2016 | Andrasko ............ G05D 1/0875 |
| 9,334,022 | B2 | 5/2016 | Gaspar et al. |
| D758,325 | S | 6/2016 | Cook et al. |
| D758,975 | S | 6/2016 | Hunter et al. |
| 9,423,894 | B2 | 8/2016 | Olsson et al. |
| 9,459,787 | B2 | 10/2016 | Kulczycki et al. |
| 9,559,649 | B2 | 1/2017 | Noh et al. |
| D782,987 | S | 4/2017 | Gassner |
| 9,710,077 | B2 | 7/2017 | Okazaki |
| D807,309 | S | 1/2018 | Johnson et al. |
| 9,891,620 | B2 * | 2/2018 | Green ..................... B63B 34/75 |
| 9,896,173 | B2 | 2/2018 | Baros et al. |
| 9,911,556 | B2 | 3/2018 | Lee et al. |
| D818,973 | S | 5/2018 | Tang et al. |
| 10,000,268 | B1 | 6/2018 | Poirier et al. |
| 10,040,522 | B1 | 8/2018 | Hartman |
| 10,281,928 | B2 | 5/2019 | Behling et al. |
| 10,358,189 | B2 | 7/2019 | Sheedy et al. |
| D858,465 | S | 9/2019 | Desbiens |
| 11,040,757 | B2 | 6/2021 | Huyge et al. |
| 12,124,276 | B2 | 10/2024 | Chan et al. |
| 2007/0221113 | A1 | 9/2007 | Detwiler et al. |
| 2007/0238370 | A1 | 10/2007 | Morvillo |
| 2011/0120364 | A1 | 5/2011 | Mueller |
| 2012/0103774 | A1 | 5/2012 | Jun |
| 2012/0247934 | A1 | 10/2012 | Schmidt et al. |
| 2013/0213293 | A1 | 8/2013 | Gasper |
| 2013/0228115 | A1 | 9/2013 | Gasper et al. |
| 2014/0043303 | A1 | 2/2014 | Baker et al. |
| 2014/0183011 | A1 | 7/2014 | Park et al. |
| 2016/0097393 | A1 | 4/2016 | Hartman |
| 2017/0250037 | A1 | 8/2017 | Tanaka et al. |
| 2017/0349257 | A1 | 12/2017 | Hara et al. |
| 2020/0108902 | A1 | 4/2020 | Wong et al. |
| 2021/0107617 | A1 | 4/2021 | Nakatani |

FOREIGN PATENT DOCUMENTS

| | | | |
|---|---|---|---|
| WO | 2013123208 | A1 | 8/2013 |
| WO | 2020069617 | A1 | 4/2020 |

OTHER PUBLICATIONS

Operator•s Manual, Dynamic Trim Control System, Series S, downloaded from https://web.archive.org/web/20180819054339/http:/www.zipwake.com/media/27494/2011298-zipwake_series_s_operators_manual_en-r4a.pdf and dated Aug. 19, 2018 by web.archive.org.

Operator•s Manual, Dynamic Trim Control System, Series E, downloaded from https://web.archive.org/web/20210410191511/http:/www.zipwake.com/media/46346/2012131-zipwake_series_e_operators_manual_en-r1a.pdf and dated Apr. 10, 2021 by web.archive.org.

Owner•s Manual, downloaded from https://www.lencomarine.com/-/media/inriver/Trim_Tab_Manual_TCHDAT.pdf? modified=20200207110343 dated May 21, 2019.

* cited by examiner

METHODS OF, AND APPARATUSES FOR, CONTROLLING AT LEAST ONE TRIM TAB OF A MARINE VESSEL

CROSS-REFERENCE TO RELATED APPLICATION

This application is a continuation of U.S. patent application Ser. No. 17/724,061 filed Apr. 19, 2022, now U.S. Pat. No. 12,124,276, which claims the benefit of, and priority to, U.S. provisional patent application No. 63/176,794 filed on Apr. 19, 2021, the entire contents of which are incorporated by reference herein.

FIELD

This disclosure relates generally to controlling at least one trim tab of a marine vessel.

RELATED ART

A marine vessel may include trim tabs, for example to control roll or pitch of the marine vessel. However, some trim-tab-control systems require manual control of each trim tab, which may be cumbersome. Some other trim-tab-control systems require sensors of angular position of the marine vessel, which may be costly, and which may produce unreliable measurements as the marine vessel moves in rough water for example.

SUMMARY

According to at least one embodiment, there is disclosed a method of controlling at least one trim tab of at least two trim tabs of a marine vessel, the method comprising causing movement of the at least one trim tab relative to a hull of the marine vessel in response to a single user input indicating an amount of change of roll or pitch of the marine vessel.

In some embodiments, the single user input indicates an amount of change of roll of the marine vessel.

In some embodiments, the roll of the marine vessel indicated by the single user input is towards a first side of the marine vessel, and the movement of the at least one trim tab comprises retracting one of the at least two trim tabs on the first side of the marine vessel.

In some embodiments, the roll of the marine vessel indicated by the single user input is towards a first side of the marine vessel, and the movement of the at least one trim tab comprises extending one of the at least two trim tabs on a second side of the marine vessel opposite the first side of the marine vessel.

In some embodiments, the movement of the at least one trim tab comprises: retracting a first trim tab of the at least two trim tabs on a first side of the marine vessel; and extending a second trim tab of the at least two trim tabs on a second side of the marine vessel opposite the first side of the marine vessel.

In some embodiments, the single user input comprises rotation of a rotatable user-input device.

In some embodiments, causing the movement of the at least one trim tab comprises causing each trim tab of the at least one trim tab to move an amount indicated by an amount of rotation of the rotatable user-input device.

In some embodiments, causing the movement of the at least one trim tab comprises causing each trim tab of the at least one trim tab to move an amount indicated by an amount of rotation of the rotatable user-input device and a user-configurable sensitivity setting.

In some embodiments, causing the movement of the at least one trim tab comprises causing each trim tab of the at least one trim tab to move an amount proportionate to an amount of rotation of the rotatable user-input device.

In some embodiments, causing the movement of the at least one trim tab comprises causing an average extension of the at least two trim tabs to be maintained.

In some embodiments, the single user input indicates an amount of change of pitch of the marine vessel.

In some embodiments, the single user input indicates a decrease in pitch of the marine vessel, and the movement of the at least one trim tab comprises retracting the at least two trim tabs.

In some embodiments, the single user input indicates an increase in pitch of the marine vessel, and the movement of the at least one trim tab comprises extending the at least two trim tabs.

In some embodiments, causing the movement of the at least one trim tab comprises causing a difference in extension of the at least two trim tabs to be maintained.

In some embodiments, the method further comprises, in response to the single user input for at least a predetermined period of time and in response to one of the at least two trim tabs reaching an end of a range of motion of the one of the at least two trim tabs, causing the difference in extension of the at least two trim tabs to be reduced.

In some embodiments, the end of the range of motion is an end of possible motion of the second trim tab.

In some embodiments, the end of the range of motion is configured.

In some embodiments, the single user input comprises user actuation of a button.

In some embodiments, causing the movement of the at least one trim tab comprises causing each trim tab of the at least one trim tab to move an amount indicated by a duration of the user actuation of a button and a user-configurable sensitivity setting.

In some embodiments, the button is on a graphical user interface.

In some embodiments, the graphical user interface is on a mobile handheld device.

In some embodiments, the graphical user interface is on a multi-function display.

In some embodiments, causing the movement of the at least one trim tab comprises causing each trim tab of the at least one trim tab to move an amount indicated by a duration of the single user input.

In some embodiments, causing the movement of the at least one trim tab comprises causing each trim tab of the at least one trim tab to move an amount indicated by a duration of the single user input and a user-configurable sensitivity setting.

In some embodiments, causing the movement of the at least one trim tab comprises causing each trim tab of the at least one trim tab to move an amount proportionate to a duration of the single user input.

In some embodiments, causing the movement of the at least two trim tabs comprises causing each trim tab of the at least two trim tabs independently of any measurement of angular position of the marine vessel.

In some embodiments, causing the movement of the at least two trim tabs comprises causing each trim tab of the at least two trim tabs independently of any steering change of any angle of thrust of the marine vessel.

In some embodiments: the single user input indicates the amount of change of roll or pitch of the marine vessel in a first direction; causing the movement of the at least one trim tab in response to the single user input comprises causing a first trim tab of the at least two trim tabs on a first side of the marine vessel to move more than a second trim tab of the at least two trim tabs on a second side of the marine vessel opposite the first side of the marine vessel by a difference between the movements of the first and second trim tabs; the method further comprises causing further movement of the at least two trim tabs in response to a subsequent user input indicating a subsequent amount of change of roll or pitch of the marine vessel in a second direction opposite the first direction; and causing the further movement of the at least two trim tabs in response to the subsequent user input comprises causing the first trim tab to move more than the second trim tab by the difference between the movements of the first and second trim tabs.

In some embodiments, causing the movement of the at least one trim tab in response to the single user input comprises causing the second trim tab to move to an end of a range of motion of the second trim tab.

In some embodiments, the end of the range of motion of the second trim tab is an end of possible motion of the second trim tab.

In some embodiments, the end of the range of motion of the second trim tab is configured.

According to at least one embodiment, there is disclosed a method of controlling at least two trim tabs of a marine vessel, the method comprising: in response to detection of at least one begin-holeshot criterion, causing the at least two trim tabs to extend increasingly during a predetermined trim-tab-extension time; and after the predetermined trim-tab-extension time, and in response to detection of stable planing of the marine vessel, causing the at least two trim tabs to retract.

In some embodiments, causing the at least two trim tabs to retract comprises causing the at least two trim tabs to retract at a retraction speed such that the at least two trim tabs retract in a predetermined retraction time.

In some embodiments, the at least one begin-holeshot criterion comprises engine output of at least one engine of the marine vessel above a begin-holeshot threshold of engine output.

In some embodiments, the begin-holeshot threshold of engine output comprises a begin-holeshot threshold of measured engine-rotation speed of the at least one engine.

In some embodiments, the at least one begin-holeshot criterion comprises a measured speed of the marine vessel not above a threshold of measured speed when the engine output of the at least one engine of the marine vessel is above the begin-holeshot threshold of engine output.

In some embodiments, the at least one begin-holeshot criterion comprises engine output of at least one engine of the marine vessel above a begin-holeshot threshold of engine output and not above a stable-planing threshold of engine output.

In some embodiments, the detection of stable planing of the marine vessel comprises detection of engine output of at least one engine of the marine vessel above an engine-output threshold.

In some embodiments, the engine-output threshold comprises a threshold of engine-rotation speed of the at least one engine.

In some embodiments, the detection of stable planing of the marine vessel comprises detection of speed of the marine vessel above a speed threshold.

In some embodiments, the detection of stable planing of the marine vessel comprises detection of expiry of a predetermined trim-tabs-extended time limit after the predetermined trim-tab-extension time.

In some embodiments, causing the at least two trim tabs to extend increasingly during the predetermined trim-tab-extension time comprises causing a difference in extension of the at least two trim tabs to be maintained throughout the predetermined trim-tab-extension time.

In some embodiments, causing the at least two trim tabs to extend increasingly during the predetermined trim-tab-extension time comprises causing the at least two trim tabs to extend increasingly during the predetermined trim-tab-extension time independently of any measurement of angular position of the marine vessel.

In some embodiments, causing the at least two trim tabs to retract comprises causing the at least two trim tabs to be in respective positions stored in storage memory.

According to at least one embodiment, there is disclosed a method of controlling at least two trim tabs of a marine vessel, the method comprising, in response to measurement of movement of the marine vessel above a movement threshold, causing the at least two trim tabs to be in respective positions identified in at least one storage memory.

In some embodiments, the method further comprises storing identifications of the positions in the at least one storage memory.

In some embodiments, storing the identifications of the positions in the storage memory comprises storing identifications of respective positions of the at least two trim tabs at a time when at least one criterion is satisfied.

In some embodiments, the at least one criterion comprises engine output of at least one engine of the marine vessel above a threshold of engine output.

In some embodiments, the threshold of engine output comprises a threshold of engine-rotation speed of the at least one engine.

In some embodiments, the at least one criterion comprises measured speed of the marine vessel above a threshold of speed of the marine vessel.

In some embodiments, causing the at least two trim tabs to be in the respective positions identified in the at least one storage memory comprises causing the at least two trim tabs to be in the respective positions identified in the at least one storage memory independently of any measurement of angular position of the marine vessel.

In some embodiments, causing the at least two trim tabs to be in the respective positions identified in the at least one storage memory comprises causing the at least two trim tabs to be in the respective positions identified in the at least one storage memory independently of any steering change of any angle of thrust of the marine vessel.

According to at least one embodiment, there is disclosed at least one computer-readable storage medium comprising stored thereon program codes that, when executed by at least one processor circuit, cause the at least one processor circuit to implement the method.

According to at least one embodiment, there is disclosed a trim-tab controller comprising at least one processor circuit operable to implement the method.

According to at least one embodiment, there is disclosed a trim-tab system comprising: the trim-tab controller; and the at least two trim tabs.

According to at least one embodiment, there is disclosed a marine vessel comprising: the trim-tab controller; and the at least two trim tabs.

According to at least one embodiment, there is disclosed a trim-tab controller for controlling at least one trim tab of at least two trim tabs of a marine vessel, the trim-tab controller comprising: a trim-tab-input device; and at least one processor circuit operable to, at least, control movement of the at least one trim tab relative to a hull of the marine vessel in response to a single user input using the trim-tab-input device and indicating an amount of change of roll or pitch of the marine vessel.

In some embodiments, the single user input indicates an amount of change of roll of the marine vessel.

In some embodiments, when the roll of the marine vessel indicated by the single user input is towards a first side of the marine vessel, the movement of the at least one trim tab comprises retracting one of the at least two trim tabs on the first side of the marine vessel.

In some embodiments, when the roll of the marine vessel indicated by the single user input is towards a first side of the marine vessel, the movement of the at least one trim tab comprises extending one of the at least two trim tabs on a second side of the marine vessel opposite the first side of the marine vessel.

In some embodiments, the movement of the at least one trim tab comprises: retracting a first trim tab of the at least two trim tabs on a first side of the marine vessel; and extending a second trim tab of the at least two trim tabs on a second side of the marine vessel opposite the first side of the marine vessel.

In some embodiments, the single user input comprises rotation of a rotatable user-input device of the trim-tab-input device.

In some embodiments, causing the movement of the at least one trim tab comprises causing each trim tab of the at least one trim tab to move an amount indicated by an amount of rotation of the rotatable user-input device.

In some embodiments, causing the movement of the at least one trim tab comprises causing each trim tab of the at least one trim tab to move an amount indicated by an amount of rotation of the rotatable user-input device and a user-configurable sensitivity setting.

In some embodiments, causing the movement of the at least one trim tab comprises causing each trim tab of the at least one trim tab to move an amount proportionate to an amount of rotation of the rotatable user-input device.

In some embodiments, causing the movement of the at least one trim tab comprises causing an average extension of the at least two trim tabs to be maintained.

In some embodiments, the single user input indicates an amount of change of pitch of the marine vessel.

In some embodiments, when the single user input indicates a decrease in pitch of the marine vessel, the movement of the at least one trim tab comprises retracting the at least two trim tabs.

In some embodiments, when the single user input indicates an increase in pitch of the marine vessel, the movement of the at least one trim tab comprises extending the at least two trim tabs.

In some embodiments, causing the movement of the at least one trim tab comprises causing a difference in extension of the at least two trim tabs to be maintained.

In some embodiments, in response to the single user input for at least a predetermined period of time and in response to one of the at least two trim tabs reaching an end of a range of motion of the one of the at least two trim tabs, the at least one processor circuit is operable to, at least, cause the difference in extension of the at least two trim tabs to be reduced.

In some embodiments, the end of the range of motion is an end of possible motion of the second trim tab.

In some embodiments, the end of the range of motion is configured.

In some embodiments, the single user input comprises user actuation of a button.

In some embodiments, causing the movement of the at least one trim tab comprises causing each trim tab of the at least one trim tab to move an amount indicated by a duration of the user actuation of a button and a user-configurable sensitivity setting.

In some embodiments, the button is on a graphical user interface of the trim-tab-input device.

In some embodiments, the graphical user interface is on a mobile handheld device.

In some embodiments, the graphical user interface is on a multi-function display.

In some embodiments, causing the movement of the at least one trim tab comprises causing each trim tab of the at least one trim tab to move an amount indicated by a duration of the single user input.

In some embodiments, causing the movement of the at least one trim tab comprises causing each trim tab of the at least one trim tab to move an amount indicated by a duration of the single user input and a user-configurable sensitivity setting.

In some embodiments, causing the movement of the at least one trim tab comprises causing each trim tab of the at least one trim tab to move an amount proportionate to a duration of the single user input.

In some embodiments, causing the movement of the at least two trim tabs comprises causing each trim tab of the at least two trim tabs independently of any measurement of angular position of the marine vessel.

In some embodiments, causing the movement of the at least two trim tabs comprises causing each trim tab of the at least two trim tabs independently of any steering change of any angle of thrust of the marine vessel.

In some embodiments, in response to the single user input indicating the amount of change of roll or pitch of the marine vessel in a first direction: causing the movement of the at least one trim tab in response to the single user input comprises causing a first trim tab of the at least two trim tabs on a first side of the marine vessel to move more than a second trim tab of the at least two trim tabs on a second side of the marine vessel opposite the first side of the marine vessel by a difference between the movements of the first and second trim tabs; the at least one processor circuit is further operable to, at least, cause further movement of the at least two trim tabs in response to a subsequent user input indicating a subsequent amount of change of roll or pitch of the marine vessel in a second direction opposite the first direction; and causing the further movement of the at least two trim tabs in response to the subsequent user input comprises causing the first trim tab to move more than the second trim tab by the difference between the movements of the first and second trim tabs.

In some embodiments, causing the movement of the at least one trim tab in response to the single user input comprises causing the second trim tab to move to an end of a range of motion of the second trim tab.

In some embodiments, the end of the range of motion of the second trim tab is an end of possible motion of the second trim tab.

In some embodiments, the end of the range of motion of the second trim tab is configured.

According to at least one embodiment, there is disclosed a trim-tab controller for controlling at least two trim tabs of a marine vessel, the trim-tab controller comprising at least one processor circuit operable to, at least: in response to detection of at least one begin-holeshot criterion, causing the at least two trim tabs to extend increasingly during a predetermined trim-tab-extension time; and after the predetermined trim-tab-extension time, and in response to detection of stable planing of the marine vessel, causing the at least two trim tabs to retract.

In some embodiments, causing the at least two trim tabs to retract comprises causing the at least two trim tabs to retract at a retraction speed such that the at least two trim tabs retract in a predetermined retraction time.

In some embodiments, the at least one begin-holeshot criterion comprises engine output of at least one engine of the marine vessel above a begin-holeshot threshold of engine output.

In some embodiments, the begin-holeshot threshold of engine output comprises a begin-holeshot threshold of measured engine-rotation speed of the at least one engine.

In some embodiments, the at least one begin-holeshot criterion comprises a measured speed of the marine vessel not above a threshold of measured speed when the engine output of the at least one engine of the marine vessel is above the begin-holeshot threshold of engine output.

In some embodiments, the at least one begin-holeshot criterion comprises engine output of at least one engine of the marine vessel above a begin-holeshot threshold of engine output and not above a stable-planing threshold of engine output.

In some embodiments, the detection of stable planing of the marine vessel comprises detection of engine output of at least one engine of the marine vessel above an engine-output threshold.

In some embodiments, the engine-output threshold comprises a threshold of engine-rotation speed of the at least one engine.

In some embodiments, the detection of stable planing of the marine vessel comprises detection of speed of the marine vessel above a speed threshold.

In some embodiments, the detection of stable planing of the marine vessel comprises detection of expiry of a predetermined trim-tabs-extended time limit after the predetermined trim-tab-extension time.

In some embodiments, causing the at least two trim tabs to extend increasingly during the predetermined trim-tab-extension time comprises causing a difference in extension of the at least two trim tabs to be maintained throughout the predetermined trim-tab-extension time.

In some embodiments, causing the at least two trim tabs to extend increasingly during the predetermined trim-tab-extension time comprises causing the at least two trim tabs to extend increasingly during the predetermined trim-tab-extension time independently of any measurement of angular position of the marine vessel.

In some embodiments, causing the at least two trim tabs to retract comprises causing the at least two trim tabs to be in respective positions stored in storage memory.

According to at least one embodiment, there is disclosed a trim-tab controller for controlling at least two trim tabs of a marine vessel, the trim-tab controller comprising: at least one storage memory; and at least one processor circuit operable to, at least, in response to measurement of movement of the marine vessel above a movement threshold, cause the at least two trim tabs to be in respective positions identified in the at least one storage memory.

In some embodiments, the at least one processor circuit is further operable to, at least, cause identifications of the positions to be stored in the at least one storage memory.

In some embodiments, storing the identifications of the positions in the storage memory comprises storing identifications of respective positions of the at least two trim tabs at a time when at least one criterion is satisfied.

In some embodiments, the at least one criterion comprises engine output of at least one engine of the marine vessel above a threshold of engine output.

In some embodiments, the threshold of engine output comprises a threshold of engine-rotation speed of the at least one engine.

In some embodiments, the at least one criterion comprises measured speed of the marine vessel above a threshold of speed of the marine vessel.

In some embodiments, causing the at least two trim tabs to be in the respective positions identified in the at least one storage memory comprises causing the at least two trim tabs to be in the respective positions identified in the at least one storage memory independently of any measurement of angular position of the marine vessel.

In some embodiments, causing the at least two trim tabs to be in the respective positions identified in the at least one storage memory comprises causing the at least two trim tabs to be in the respective positions identified in the at least one storage memory independently of any steering change of any angle of thrust of the marine vessel.

According to at least one embodiment, there is disclosed a trim-tab system comprising: the trim-tab controller; and the at least two trim tabs.

According to at least one embodiment, there is disclosed a marine vessel comprising: the trim-tab controller; and the at least two trim tabs.

According to at least one embodiment, there is disclosed a trim-tab controller for controlling at least one trim tab of at least two trim tabs of a marine vessel, the trim-tab controller comprising a trim-tab-input device. The trim-tab controller further comprises at least one processor circuit programmed to, at least: in response to a first user input using the trim-tab-input device and indicating an amount of change of roll or pitch of the marine vessel in a first direction, cause a first trim tab of the at least two trim tabs on a first side of the marine vessel to move relative to a hull of the marine vessel more than a second trim tab of the at least two trim tabs on a second side of the marine vessel opposite the first side of the marine vessel by a difference between the movements of the first and second trim tabs relative to the hull; and in response to a subsequent user input indicating a subsequent amount of change of roll or pitch of the marine vessel in a second direction opposite the first direction, cause the first trim tab to move relative to the hull more than the second trim tab.

In some embodiments, the at least one processor circuit is programmed to at least, in response to the subsequent user input, cause the first trim tab to move relative to the hull more than the second trim tab by the difference between the movements of the first and second trim tabs.

In some embodiments, the first user input is a single user input.

In some embodiments, the first and subsequent user inputs indicate respective amounts of change of roll of the marine vessel.

In some embodiments, the first user input comprises rotation of a rotatable user-input device of the trim-tab-input device.

In some embodiments, the at least one processor circuit is programmed to, at least, cause each trim tab of the at least one trim tab to move an amount indicated by an amount of rotation of the rotatable user-input device.

In some embodiments, the at least one processor circuit is programmed to, at least, cause each trim tab of the at least one trim tab to move an amount indicated by an amount of rotation of the rotatable user-input device and a user-configurable sensitivity setting.

In some embodiments, the at least one processor circuit is programmed to, at least, cause each trim tab of the at least one trim tab to move an amount proportionate to an amount of rotation of the rotatable user-input device.

In some embodiments, the first and subsequent user inputs indicate respective amounts of change of pitch of the marine vessel.

In some embodiments, the first user input comprises user actuation of a button.

In some embodiments, the at least one processor circuit is programmed to, at least, cause each trim tab of the at least one trim tab to move an amount indicated by a duration of the first user input.

In some embodiments, the at least one processor circuit is programmed to, at least, cause each trim tab of the at least one trim tab to move an amount indicated by a duration of the first user input and a user-configurable sensitivity setting.

In some embodiments, the at least one processor circuit is programmed to, at least, cause each trim tab of the at least one trim tab to move an amount proportionate to a duration of the first user input.

In some embodiments, the at least one processor circuit is programmed to, at least, cause each trim tab of the at least one trim tab to move independently of any measurement of angular position of the marine vessel.

In some embodiments, the at least one processor circuit is programmed to, at least, cause each trim tab of the at least one trim tabs to move independently of any steering change of any angle of thrust of the marine vessel.

In some embodiments, the at least one processor circuit is programmed to at least, in response to the first user input, cause first trim tab to move relative to the hull more than the second trim tab in response to the second trim tab reaching an end of a range of motion of the second trim tab.

In some embodiments, the end of the range of motion of the second trim tab is an end of possible motion of the second trim tab.

In some embodiments, the end of the range of motion of the second trim tab is configured.

In some embodiments, the at least one processor circuit is programmed to, at least, cause the first trim tab to move relative to the hull more than the second trim tab by the difference in response to the first user input for at least a predetermined period of time after the first trim tab reaches the end of the range of motion.

According to at least one embodiment, there is disclosed a trim-tab system comprising: the trim-tab controller; and the at least two trim tabs.

According to at least one embodiment, there is disclosed a marine vessel comprising: the trim-tab controller; and the at least two trim tabs.

Other aspects and features will become apparent to those ordinarily skilled in the art upon review of the following description of illustrative embodiments in conjunction with the accompanying figures.

DETAILED DESCRIPTION

Marine Vessel

Figure 1:
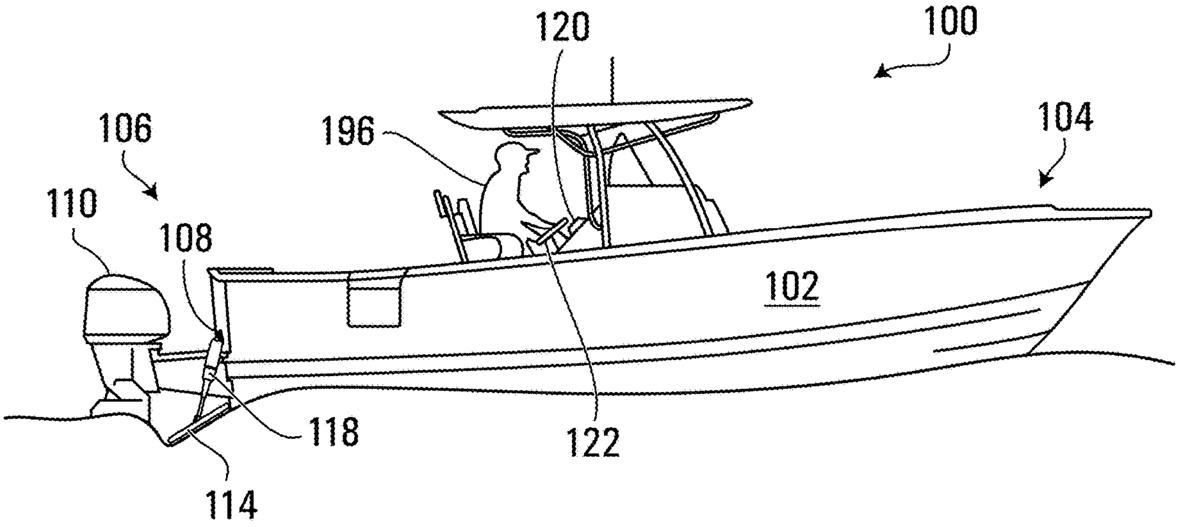
FIG. 1 is a side view of a marine vessel according to one embodiment.
Figure 2:
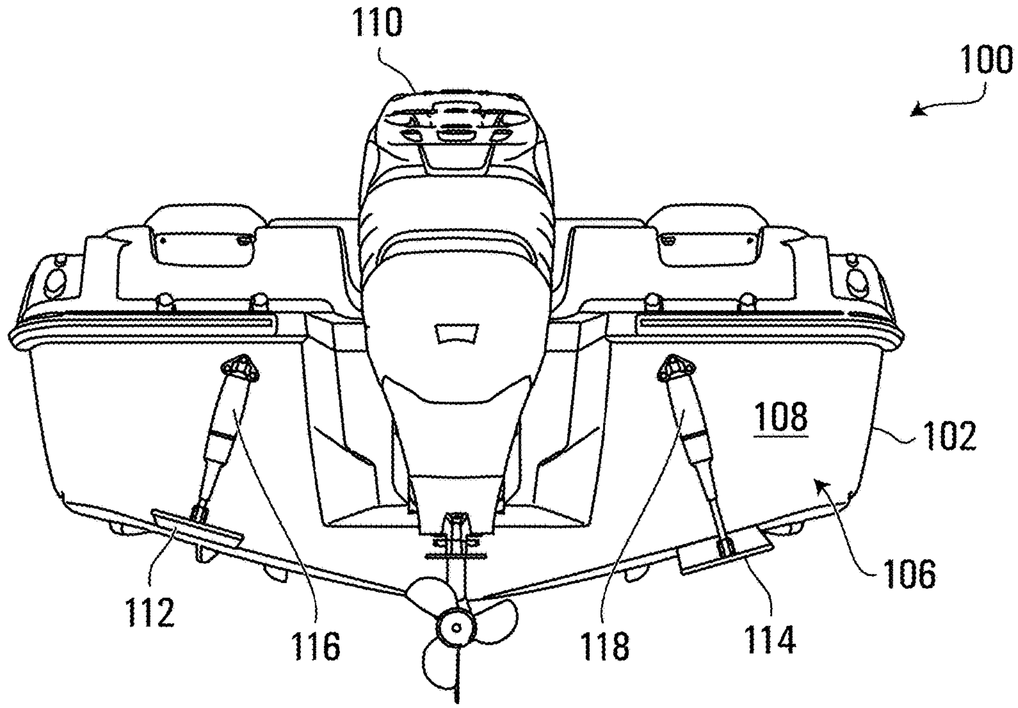
FIG. 2 is a rear view of the marine vessel of FIG. 1.
Figure 3:
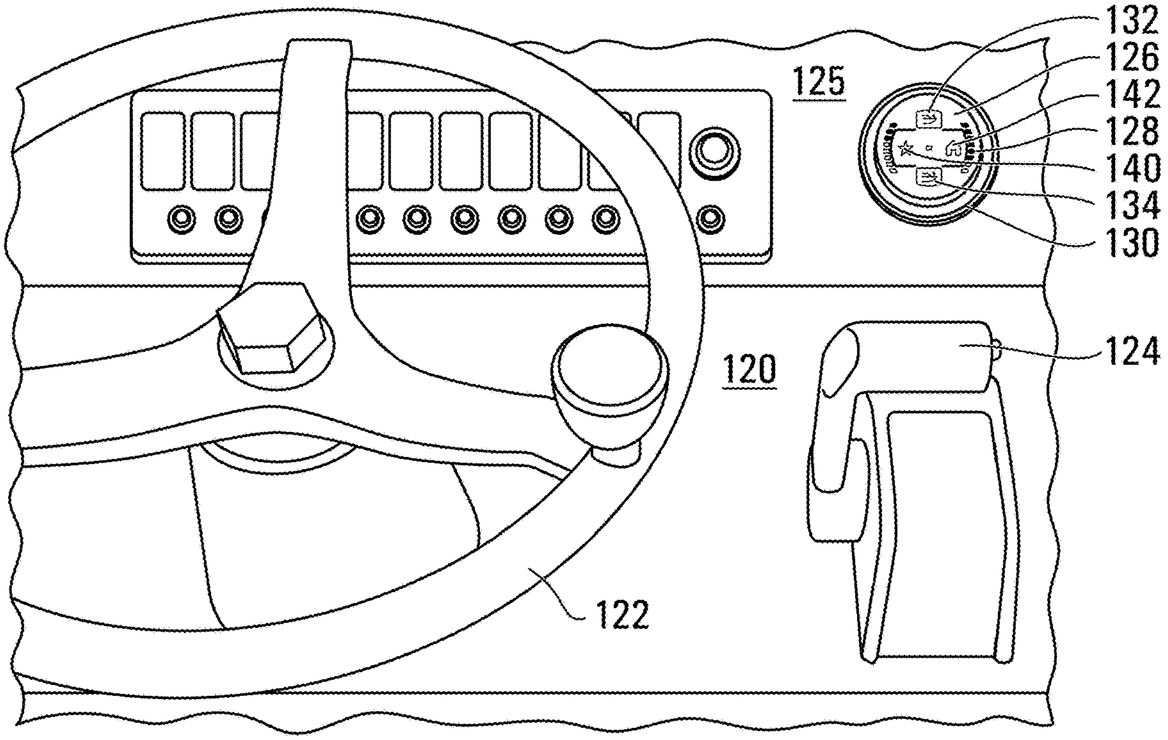
FIG. 3 is a perspective view of a dashboard of the marine vessel of FIG. 1.

Referring to FIG. 1, FIG. 2, and FIG. 3, a marine vessel according to one embodiment is shown generally 100 and includes a hull 102 having a bow shown generally at 104 and a stern shown generally at 106. At the stern 106, the marine vessel 100 includes a transom 108 and an outboard motor (or engine) 110. The outboard motor 110 is steerable relative to the hull 102 and relative to the transom 108. The outboard motor 110 is also operable to generate a thrust force, and steering the outboard motor 110 may change an angle of the thrust force relative to the hull 102 to steer the marine vessel 100.

Also at the stern 106, the marine vessel 100 includes a port trim tab 112 and a starboard trim tab 114. The trim tabs 112 and 114 may be made of metal, and may be positioned and movable such that, when the marine vessel 100 is in use in water, the trim tabs 112 and 114 may be removable from the water and may be movable to contact the water at variable angles. A port actuator 116 is coupled to the transom 108 and to the port trim tab 112 and operable to move the port trim tab 112 relative to the hull 102 and relative to the transom 108. A starboard actuator 118 is coupled to the transom 108 and to the starboard trim tab 114 and operable to move the starboard trim tab 114 relative to the hull 102 and relative to the transom 108 independently of movement of the port trim tab 112.

In general, movement of the port trim tab 112 relative to the hull 102 and relative to the transom 108 involves rotation of the port trim tab 112 in a range of motion of the port trim tab 112 about an axis that is generally transverse relative to the hull 102 such that the port trim tab 112 moves up and down relative to the hull 102, and movement of the starboard trim tab 114 relative to the hull 102 and relative to the transom 108 involves rotation of the starboard trim tab 114 in a range of motion of the starboard trim tab 114 about an axis that is generally transverse relative to the hull 102 such that the starboard trim tab 114 moves up and down relative to the hull 102.

In some embodiments, the ranges of motion of trim tabs as described herein may be restricted only by possible motion of the trim tab. In other words, in such embodiments, a retracted end of a range of motion of a trim tab as described herein may be the most-retracted position relative to the hull 102 and relative to the transom 108 that is possible for the trim tab, and an extended end of the range of motion of the trim tab may be the most-extended position relative to the hull 102 and relative to the transom 108 that is possible for the trim tab.

Alternatively, a range of motion of a trim tab as described herein may be configured (for example, user-configured by user configuration of a range-of-motion-end parameter) such that a retracted end of the range of motion of the trim tab may be a configured position relative to the hull 102 and relative to the transom 108 that is not as retracted as the most-retracted position relative to the hull 102 and relative to the transom 108 that is possible for the trim tab, an extended end of the range of motion of the trim tab may be a configured position relative to the hull 102 and relative to the transom 108 that is not as extended as the most-extended position relative to the hull 102 and relative to the transom 108 that is possible for the trim tab, or both.

The port actuator 116 may include a position sensor indicating an amount of extension of the port actuator 116, which may indicate a position of the port trim tab 112 relative to the hull 102 and relative to the transom 108. Likewise, the starboard actuator 118 may include a position sensor indicating an amount of extension of the starboard actuator 118, which may indicate a position of the starboard trim tab 114 relative to the hull 102 and relative to the transom 108. However, such position sensors are optional, and may be omitted in some embodiments.

The marine vessel 100 also includes a dashboard 120 including a helm 122, an engine throttle control 124, and a multi-function display (or a multi-function device) 125.

The marine vessel 100 is an example only, and alternative embodiments may differ. For example, marine vessels of alternative embodiments may include more than one motor or engine, or one or more alternatives to the outboard motor 110. Further, marine vessels of alternative embodiments may include more than one actuator (instead of a single port actuator 116) operable to move the port trim tab 112, more than one actuator (instead of a single starboard actuator 118) operable to move the starboard trim tab 114, or both. Further, marine vessels of alternative embodiments may include more than two trim tabs or one or more alternatives to the port trim tab 112, to the starboard trim tab 114, or to both. Further, marine vessels of alternative embodiments may include more than two trim tabs or one or more alternatives to the helm 122, to the engine throttle control 124, or to both. Such alternatives may have different appearances, may be in different positions, or both.

Trim-Tab Input Device

Figure 4:
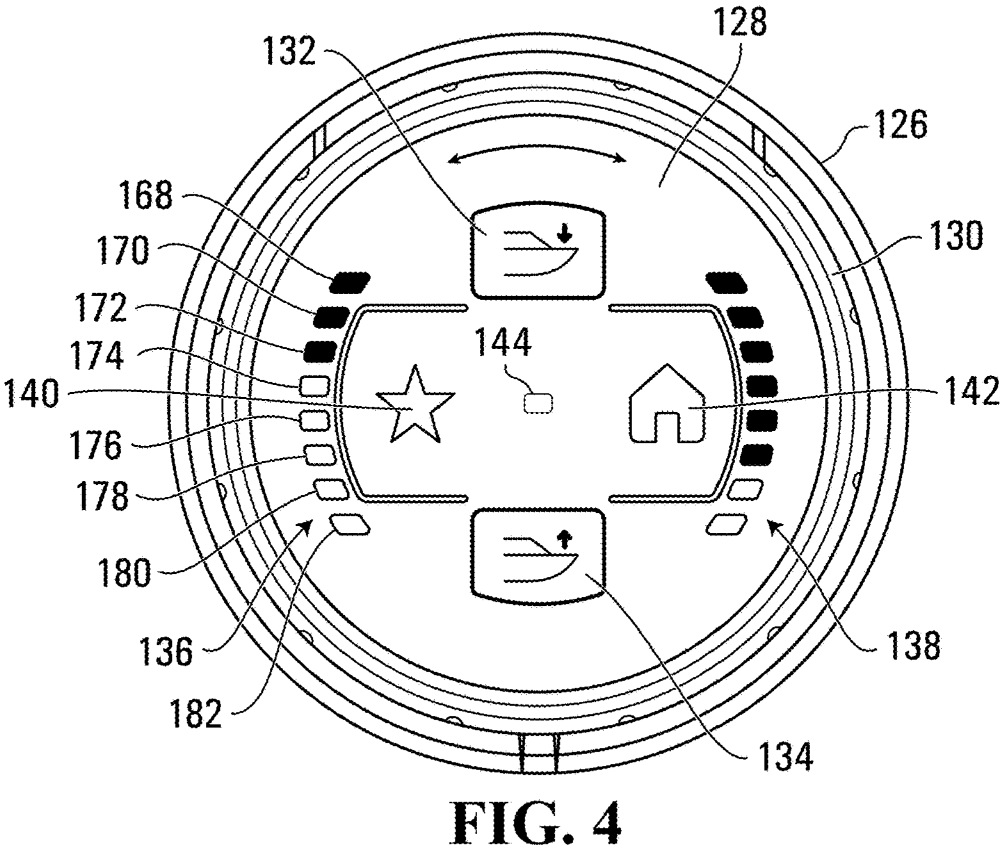
FIG. 4 is a front view of a trim-tab-input device of the dashboard of FIG. 3.
Figure 5:
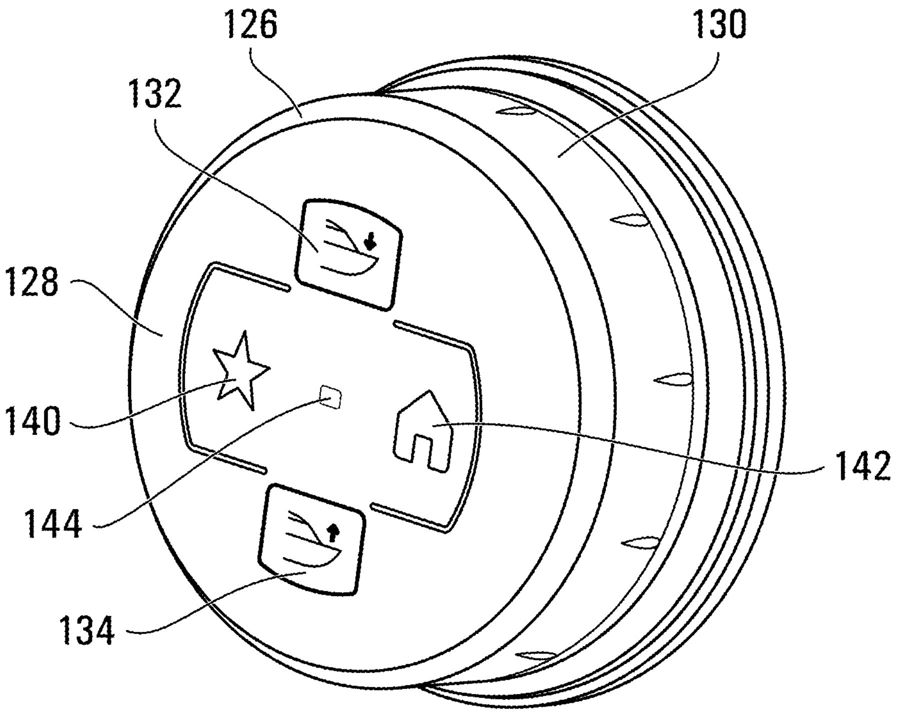
FIG. 5 is a perspective view of the trim-tab-input device of FIG. 4.

Referring to FIG. 3, FIG. 4, and FIG. 5, the dashboard 120 also includes a trim-tab-input device 126. The trim-tab-input device 126 has a front face 128 and includes a ring 130 surrounding the front face 128 and rotatable relative to the dashboard 120 and relative to the front face 128. The ring 130 may be rotatable relative to the dashboard 120 and relative to the front face 128 by discrete increments, such as by a detent that may create rotational resistance or "clicks" between discrete rotational positions relative to the dashboard 120 and relative to the front face 128. On the front face 128, the trim-tab-input device 126 includes a bow-down (or trim-down button) 132, a bow-up (or trim-up) button 134, a port-trim-tab-extension indicator shown generally at 136, a starboard-trim-tab-extension indicator shown generally at 138, a mode-selection button 140, a home button 142, and a status indicator 144. The buttons of the trim-tab-input device 126 are physical buttons that may move relative to other portions of a trim-tab-input device in response to user actuation of the buttons.

However, the trim-tab-input device 126 is an example only, and alternative embodiments may differ. For example, trim-tab-input devices of alternative embodiments may include more or fewer user inputs, or one or more alternatives to the user inputs of the trim-tab-input device 126. For example, in alternative embodiments, user inputs of trim-tab-input devices may have different appearances, different positions, or both, and user inputs of alternative embodiments may not necessarily be a physical button that may move relative to other portions of a trim-tab-input device in response to user actuation of the button. Alternative embodiments may also include alternatives to the ring 130. Further, alternative embodiments may include one or more alternatives to the port-trim-tab-extension indicator 136, to the starboard-trim-tab-extension indicator 138, or to both, and such alternatives may have different appearances, may be in different positions, or both, or alternative embodiments may omit one or both of the port-trim-tab-extension indicator 136 and the starboard-trim-tab-extension indicator 138. Alternative embodiments may also include alternatives to the mode-selection button 140, to the home button 142, to the status indicator 144, or to two or more thereof, or may omit one or more thereof.

Figure 6:
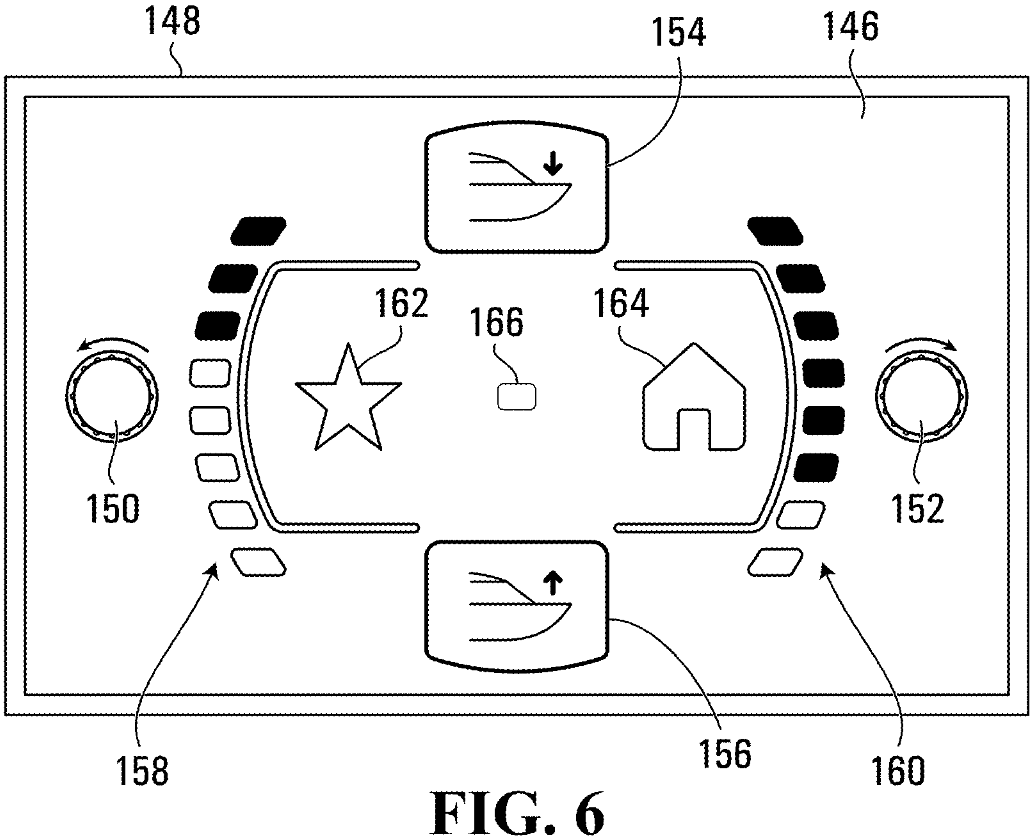
FIG. 6 is a front view of a trim-tab-input device on a touch screen according to another embodiment.

Referring to FIG. 6, a trim-tab-input device of an alternative embodiment may include a touch screen 146 of a mobile handheld device 148, which may be a smartphone, a smartwatch, or a tablet computer, for example. However, trim-tab-input devices of alternative embodiments may be one or more other touch screens that may not necessarily be touch screens of a mobile handheld device. For example, in some embodiments, the multi-function display 125 may include a touch screen such as the touch screen 146.

The touch screen 146 includes user inputs and indicators that may function similarly to the user inputs and indicators of the trim-tab-input device 126. For example, the touch screen 146 includes: a rotate-counterclockwise button 150 that, when actuated, functions similarly to counterclockwise rotation of the ring 130; a rotate-clockwise button 152 that, when actuated, functions similarly to clockwise rotation of the ring 130; a bow-down button 154 that, when actuated, functions similarly to the bow-down button 132 when actuated; a bow-up button 156 that, when actuated, functions similarly to the bow-up button 134 when actuated; a port-trim-tab-extension indicator shown generally at 158 that functions similarly to the port-trim-tab-extension indicator 136; a starboard-trim-tab-extension indicator shown generally at 160 that functions similarly to the starboard-trim-tab-extension indicator 138; a mode-selection button 162 that, when actuated, functions similarly to the mode-selection button 140 when actuated; a home button 164 that, when actuated, functions similarly to the home button 142 when actuated; and a status indicator 166 that functions similarly to the status indicator 144.

Therefore, "button" herein may refer to a physical button that moves relative to other portions of a trim-tab-input device in response to user actuation of the button, or "button" herein may refer to a button on a touch screen or still other types of user-input devices, for example.

The touch screen 146 is also an example only, and alternative embodiments may differ. For example, touch screens of alternative embodiments may include more, fewer, or different user inputs, indicators, or both. Such alternatives may have different appearances, may be in different positions, or both. For example, some embodiments may include a combination of the trim-tab-input device 126 and the touch screen 146.

Figure 8:
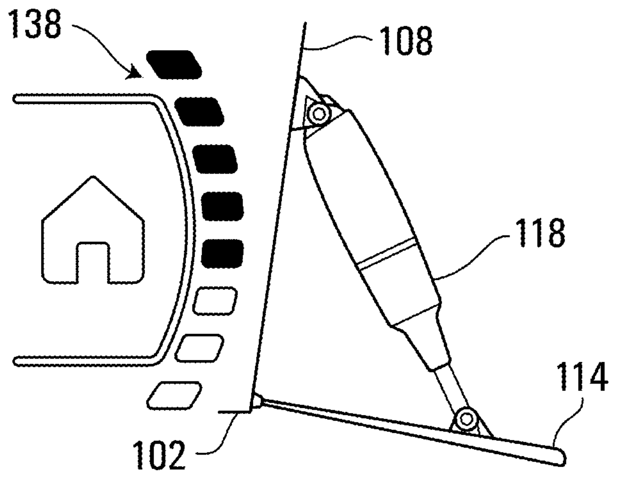
FIG. 8 is a side view of the trim tab of FIG. 7 in a partially extended position.
Figure 9:
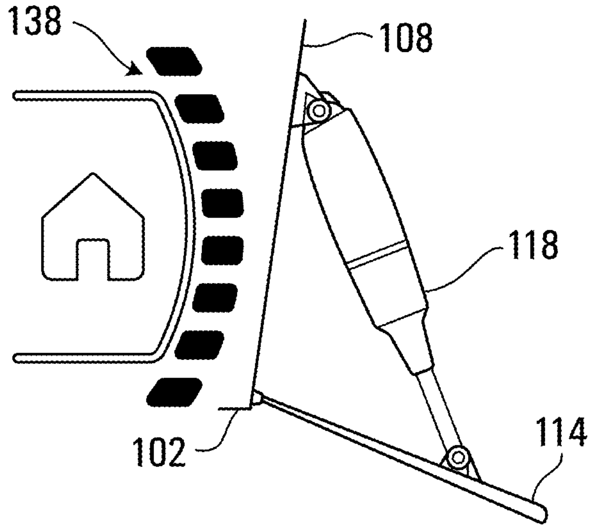
FIG. 9 is a side view of the trim tab of FIG. 7 in a fully extended position.

In general, user input using a trim-tab-input device (such as the trim-tab-input device 126 or the touch screen 146) may cause movement of the port trim tab 112, the starboard trim tab 114, or both as described above. For example, in one embodiment, FIG. 7 illustrates the starboard trim tab 114 in a fully retracted position (or at a retracted end of a range of motion of the starboard trim tab 114) relative to the hull 102 and relative to the transom 108, FIG. 8 illustrates the starboard trim tab 114 in a partially extended position relative to the hull 102 and relative to the transom 108, and FIG. 9 illustrates the starboard trim tab 114 in a fully extended position (or at an extended end of the range of motion of the starboard trim tab 114) relative to the hull 102 and relative to the transom 108.

Also, in general, each of the indicators 136, 138, 158, and 160 may indicate an amount of extension of a respective trim tab. The port-trim-tab-extension indicators 136 and 158 may indicate an amount of extension of the port trim tab 112, and the starboard-trim-tab-extension indicators 138 and 160 may indicate an amount of extension of the starboard trim tab 114. In the embodiment shown, each of the indicators 136, 138, 158, and 160 includes eight illuminable portions, such as the illuminable portions 168, 170, 172, 174, 176, 178, 180, and 182 of the port-trim-tab-extension indicator 136, as shown in FIG. 4.

Figure 7:
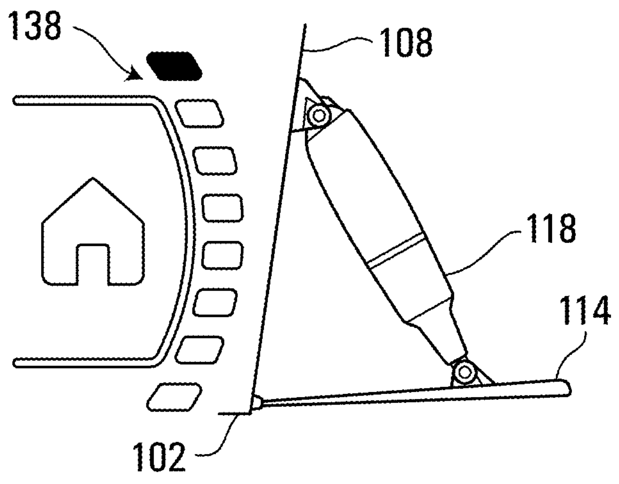
FIG. 7 is a side view of a trim tab of the marine vessel of FIG. 1 in a fully retracted position.

As shown in FIG. 7, in the embodiment shown, only the first illuminable portion of the starboard-trim-tab-extension indicator 138 may be illuminated to indicate that the starboard trim tab 114 is positioned relative to the hull 102 and relative to the transom 108 at a retracted end of a range of motion of the starboard trim tab 114. Also, as shown in FIG. 9, in the embodiment shown, all eight illuminable portions of the starboard-trim-tab-extension indicator 138 may be illuminated to indicate that the starboard trim tab 114 is positioned relative to the hull 102 and relative to the transom 108 at an extended end of the range of motion of the starboard trim tab 114. Between ends of a range of motion of a trim tab as described herein, a number of illuminable portions of may indicate a degree of extension within the range of motion. For example, in the embodiment of FIG. 4, the first three illuminable portions 168, 170, and 172 of the port-trim-tab-extension indicator 136 are illuminated, indicating that the port trim tab 112 is extended approximately ⅜ or approximately 37.5% of a distance between a retracted end of a range of motion of the port trim tab 112 and an extended end of a range of motion of the port trim tab 112. Likewise, in the embodiment of FIG. 4, the first five illuminable portions of the starboard-trim-tab-extension indicator 138 are illuminated, indicating that the starboard trim tab 114 is extended approximately ⅝ or approximately 62.5% of a distance between a retracted end of a range of motion of the starboard trim tab 114 and an extended end of a range of motion of the starboard trim tab 114.

Trim-Tab Control System

Figure 10:
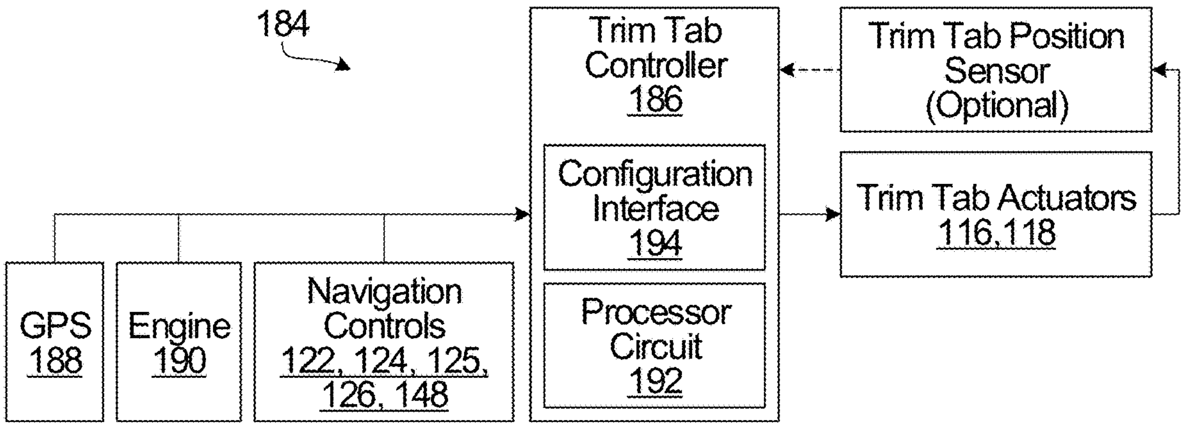
FIG. 10 is a schematic illustration of a trim-tab-control system of the marine vessel of FIG. 1.

Referring to FIG. 10, a trim-tab-control system according to one embodiment is shown generally at 184 and includes a trim-tab controller 186, which is an apparatus for controlling at least one trim tab of the marine vessel 100. The trim-tab-control system 184 also includes a boat-speed sensor such as a global positioning system (GPS) sensor 188 operable to provide, to the trim-tab controller 186, one or more signals representing a measured speed of the marine vessel 100. Alternative embodiments may include one or more boat-speed sensors that may not necessarily be a GPS sensor. The trim-tab-control system 184 also includes an engine-speed sensor 190 operable to provide, to the trim-tab controller 186, one or more signals representing a measured engine-rotation speed of the outboard motor 110. The trim-tab controller 186 is also operable to receive one or more navigation control signals from navigation controls (such as the helm 122, the engine throttle control 124, the multi-function display 125, the trim-tab-input device 126, the touch screen 146, a joystick navigation control, a remote control, or a combination of two or more thereof, for example). In some embodiments, one or more controller area network (CAN) bus networks may communicate one or more signals between the trim-tab controller 186 and some or all of the actuators 116 and 118, the GPS sensor 188, the engine-speed sensor 190, and the navigation controls, for example.

The trim-tab controller 186 includes a processor circuit 192 that may include one or more central processing unit (CPUs) or microprocessors, one or more machine learning chips, discrete logic circuits, or one or more application-specific integrated circuit (ASICs), or combinations of two or more thereof, for example, and that may include one or more of the same or different computer-readable storage media, which in various embodiments may include one or more of a read-only memory (ROM), a random access memory (RAM), a hard disc drive (HDD), a solid-state drive (SSD), and other computer-readable and/or computer-writable storage media. For example, one or more such computer-readable storage media may store program codes that, when executed, cause one or more processor circuits to implement functions as described herein, for example, in which case the trim-tab controller 186 may be programmed, configured, or operable to implement such functions. Of course a trim-tab controller may be configured or otherwise operable to implement other functions and to implement functions in other ways. For example, some embodiments may include more than one controller (such as one controller on a main control station and another controller mounted on a flybridge) that may function together as a trim-tab controller as described herein.

The trim-tab controller 186 also includes a configuration interface 194 (which may include, for example, one or more buttons of trim-tab-input device 126, of the touch screen 146, or of the multi-function display 125, or another interface) to allow user configuration as described herein, for example. For example, as indicated above, a range of motion of a trim tab as described herein may be configured (for example, user-configured) such that a retracted end of the range of motion of the trim tab may be a configured position relative to the hull 102 and relative to the transom 108 that is not as retracted as the most-retracted position relative to the hull 102 and relative to the transom 108 that is possible for the trim tab, an extended end of the range of motion of the trim tab may be a configured position relative to the hull 102 and relative to the transom 108 that is not as extended as the most-extended position relative to the hull 102 and relative to the transom 108 that is possible for the trim tab, or both. User input using the configuration interface 194 may cause one or more computer-readable and/or computer-writable storage media in the processor circuit 192 to store one or more storage codes representing one or more such configured positions. The configuration interface 194 may allow other user configuration as described herein, for example. In general, in some embodiments, user configuration may cause one or more computer-readable and/or computer-writable storage media in the processor circuit 192 to store one or more storage codes representing the user configuration as described herein, for example.

As indicated above, the port actuator 116 may include a position sensor indicating an amount of extension of the port actuator 116, which may indicate a position of the port trim tab 112 relative to the hull 102 and relative to the transom 108, and the starboard actuator 118 may include a position sensor indicating an amount of extension of the starboard actuator 118, which may indicate a position of the starboard trim tab 114 relative to the hull 102 and relative to the transom 108. Therefore, in some embodiments, the trim-tab controller 186 may control the port actuator 116 by transmitting, to the port actuator 116, one or more signals indicating a desired amount of extension of the port actuator 116, and the port actuator 116 may move until the position sensor of the port actuator 116 senses that the port actuator 116 has the desired amount of extension. Likewise, in some embodiments, the trim-tab controller 186 may control the starboard actuator 118 by transmitting, to the starboard actuator 118, one or more signals indicating a desired amount of extension of the starboard actuator 118, and the starboard actuator 118 may move until the position sensor of the starboard actuator 118 senses that the starboard actuator 118 has the desired amount of extension.

However, as also indicated above, such position sensors are optional. Therefore, in other embodiments, the trim-tab controller 186 may control the port actuator 116 by transmitting, to the port actuator 116, one or more signals indicating a desired change to an amount of extension of the port actuator 116, and the trim-tab controller 186 may control the starboard actuator 118 by transmitting, to the starboard actuator 118, one or more signals indicating a desired change to an amount of extension of the starboard actuator 118.

Also, in some embodiments, the trim-tab controller 186 may control the port actuator 116 by transmitting, to the port actuator 116, one or more signals indicating a desired rate of change to an amount of extension of the port actuator 116 (or a desired speed of the port actuator 116), and the trim-tab controller 186 may control the starboard actuator 118 by transmitting, to the starboard actuator 118, one or more signals indicating a desired rate of change to an amount of extension of the starboard actuator 118 (or a desired speed of the starboard actuator 118).

Figure 11:
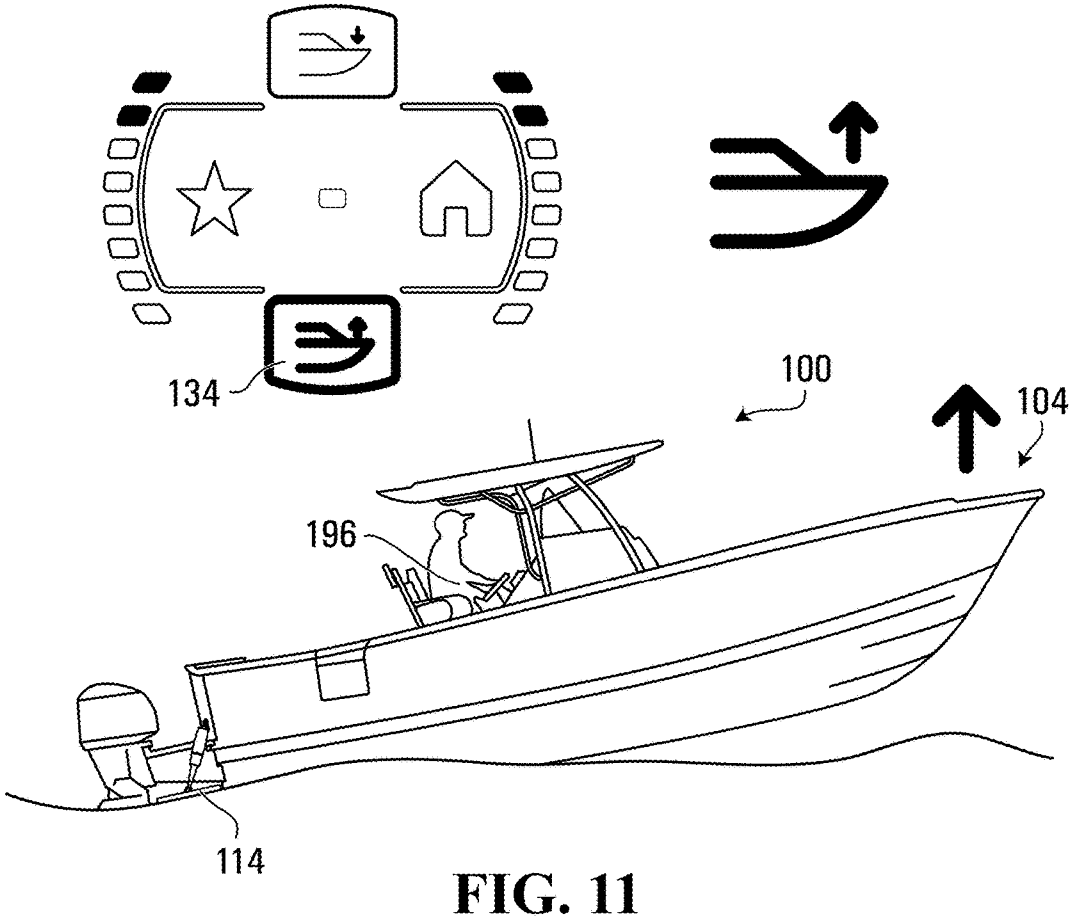
FIG. 11 is a side view of the marine vessel of FIG. 1, illustrating an example of user actuation of a bow-up button of the trim-tab-input device of FIG. 4.

FIG. 11 illustrates an example of operation of the trim-tab controller 186. In that example, in response to user actuation of the bow-up button 134, the trim-tab controller 186 causes both the trim tabs 112 and 114 to retract. Such retraction of the trim tabs 112 and 114 may cause the bow 104 of the marine vessel 100 to trim up, and the user actuation of the bow-up button 134 is an example of a single user input indicating an amount of change of pitch of the marine vessel.

Figure 12:
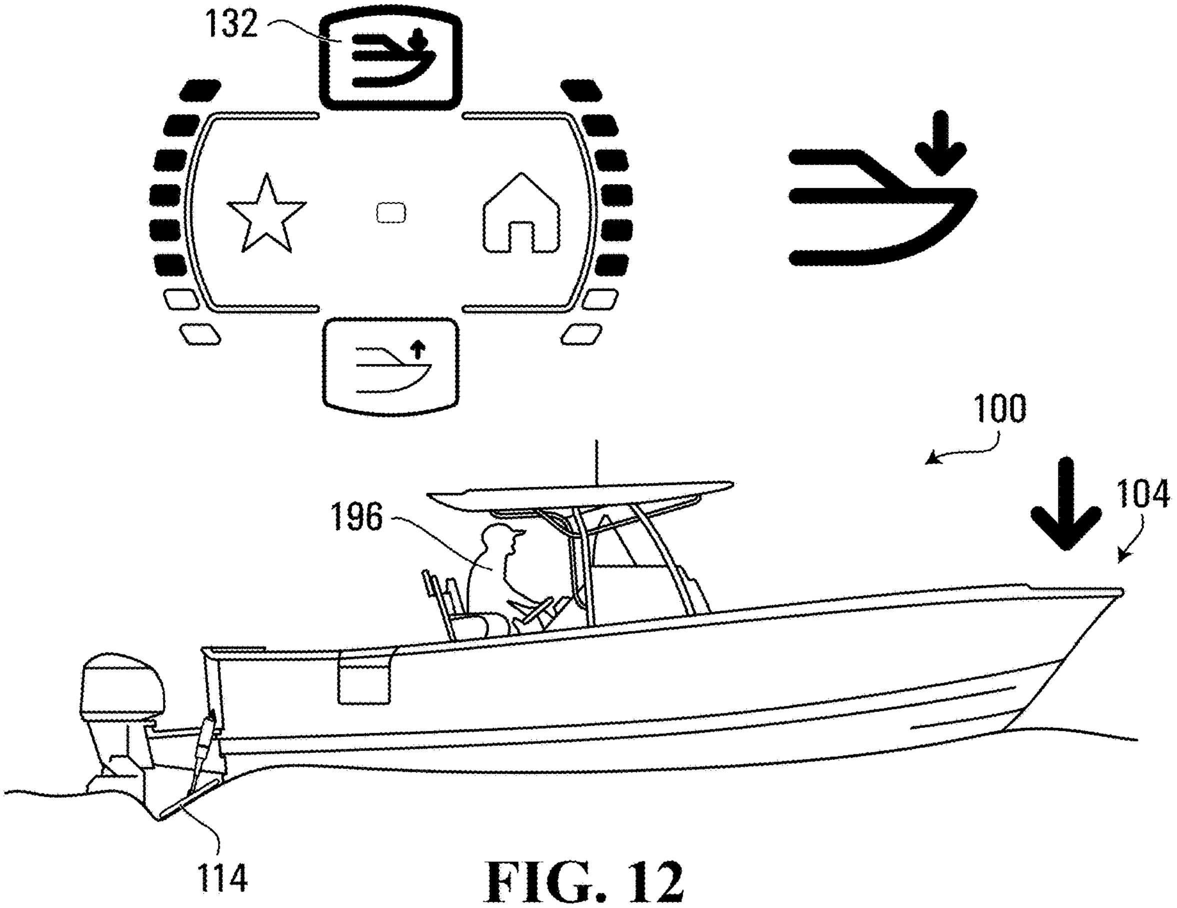
FIG. 12 is a side view of the marine vessel of FIG. 1, illustrating an example of user actuation of a bow-down button of the trim-tab-input device of FIG. 4.

FIG. 12 illustrates another example of operation of the trim-tab controller 186. In that example, in response to user actuation of the bow-down button 132, the trim-tab controller 186 causes both the trim tabs 112 and 114 to extend. Such extension of the trim tabs 112 and 114 may cause the bow 104 of the marine vessel 100 to trim down, and the user actuation of the bow-up button 134 is an example of a single user input indicating an amount of change of pitch of the marine vessel.

Figure 13:
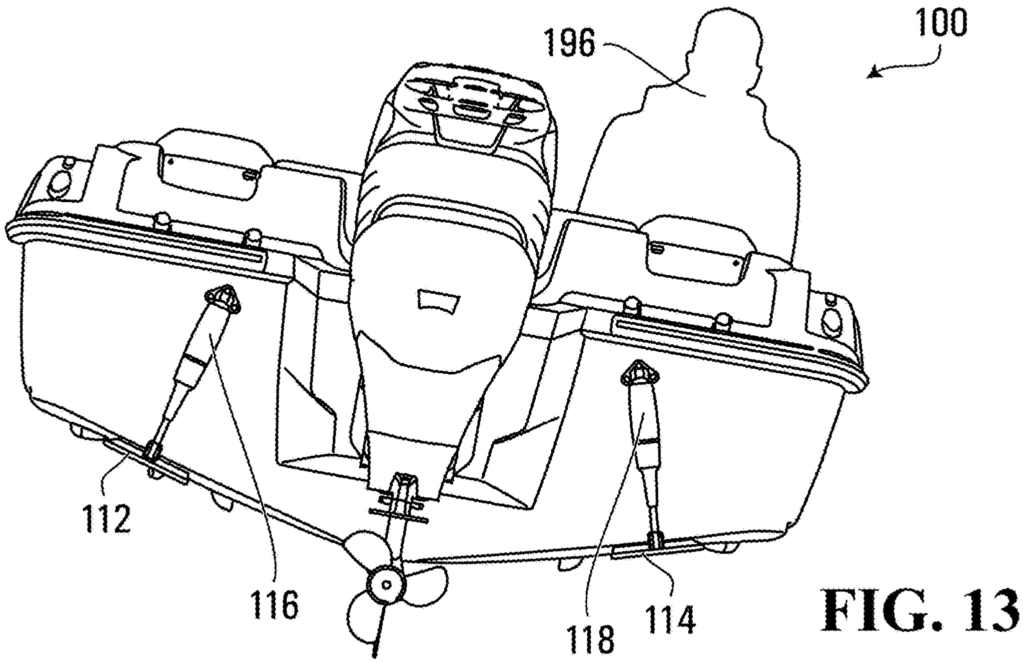
FIG. 13 and FIG. 14 are rear views of the marine vessel of FIG. 1, illustrating an example of user actuation of a ring of the trim-tab-input device of FIG. 4.
Figure 14:
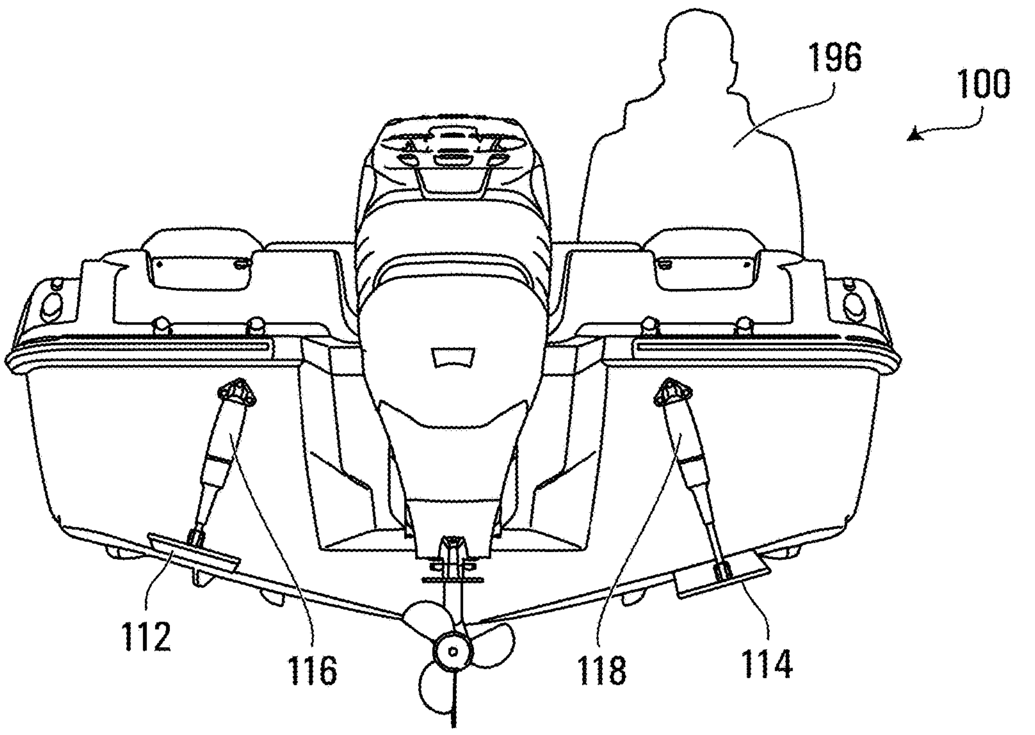

FIG. 13 and FIG. 14 illustrate another example of operation of the trim-tab controller 186. In that example, as shown in FIG. 13, the marine vessel 100 lists towards starboard, for example because of weight of an operator 196 on the starboard side of the marine vessel 100. In response to user input involving counterclockwise rotation of the ring 130, the trim-tab controller 186 controls the actuators 116 and 118 to cause the port trim tab 112 to retract and to cause the starboard trim tab 114 to extend. Such retraction of the port trim tab 112 and such extension of the starboard trim tab 114 may cause a correction to the list of the marine vessel 100 by rolling the marine vessel 100 towards port, as shown in FIG. 14. The ring 130 is therefore an example of a rotatable user-input device, and the user rotation of the ring 130 is an example of a single user input indicating an amount of change of roll of the marine vessel.

The examples of FIG. 11 to FIG. 14 are examples of causing movement of one or more trim tabs (the trim tabs 112 and 114 in those examples) relative to the hull 102 and relative to the transom 108 in response to a single user input (namely user actuation of the bow-down button 132, user actuation of the bow-up button 134, or rotation of the ring 130 in those examples) indicating an amount of change of roll or pitch of the marine vessel.

In the examples of FIG. 11 and FIG. 12, the one or more trim tabs may move relative to the hull 102 and relative to the transom 108 by an amount indicated by a duration of user actuation of the buttons as described above. For example, in some embodiments, the one or more trim tabs may move relative to the hull 102 and relative to the transom 108 by an amount proportionate to a duration of user actuation of such a button (or, more generally, a duration of a single user input).

Also, in the example of FIG. 13 and FIG. 14, the one or more trim tabs may move relative to the hull 102 and relative to the transom 108 by an amount indicated by an amount of rotation of the ring 130. For example, as indicated above, the ring 130 may be rotatable relative to the dashboard 120 and relative to the front face 128 by discrete increments, such as by a detent that may create rotational resistance or “clicks” between discrete rotational positions relative to the dashboard 120 and relative to the front face 128. In some embodiments, rotation of the ring 130 from one such discrete rotational position to an adjacent such discrete rotational position may cause a predefined amount of movement of the one or more trim tabs relative to the hull 102 and relative to the transom 108. Therefore, in some embodiments, the one or more trim tabs may move relative to the hull 102 and relative to the transom 108 by an amount proportionate to an amount of rotation of the ring 130.

Roll Protection

Figure 15:
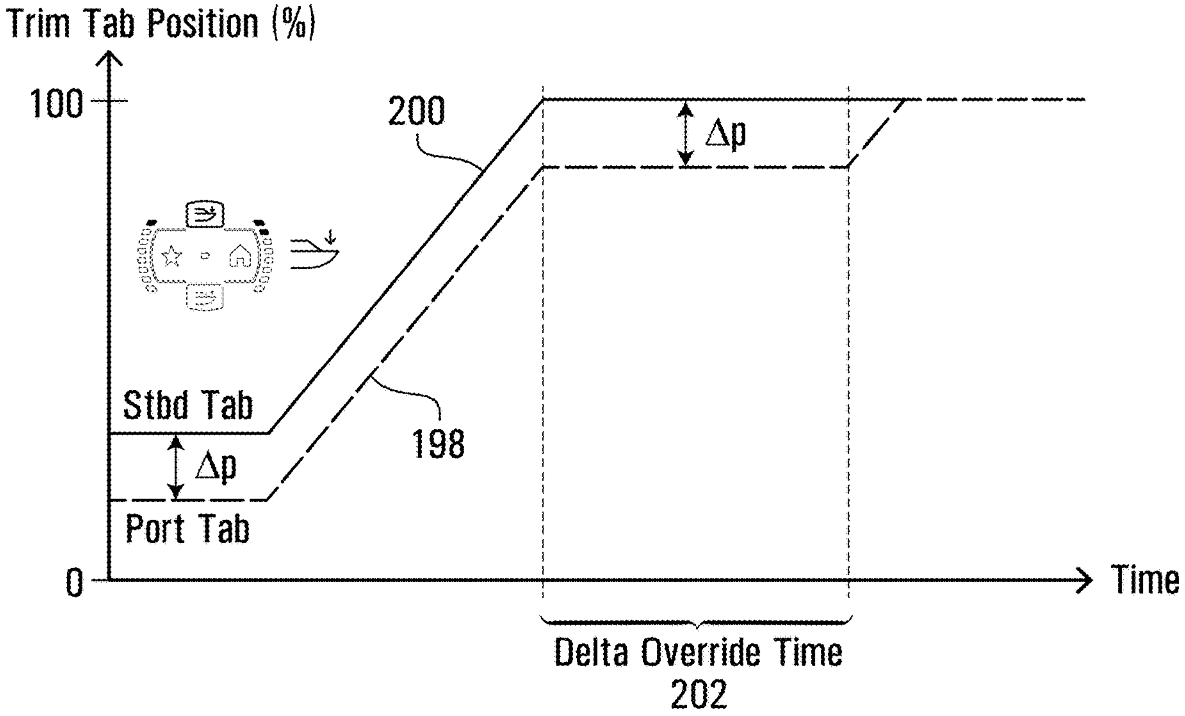
FIG. 15 to FIG. 24 illustrate examples of movement of trim tabs of the marine vessel of FIG. 1.

FIG. 15 illustrates an example of movement of the trim tabs 112 and 114 relative to the hull 102 and relative to the transom 108 under control of the trim-tab controller 186. In FIG. 15, a line 198 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 200 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

As in the example of FIG. 12, FIG. 15 illustrates the trim-tab controller 186 causing both the trim tabs 112 and 114 to extend in response to user actuation of the bow-down button 132. Therefore, the example of FIG. 15 is another example of causing movement of one or more trim tabs (the trim tabs 112 and 114 in that example) relative to the hull 102 and relative to the transom 108 in response to a single user input (namely user actuation of the bow-down button 132 in that example) indicating an amount of change of pitch of the marine vessel. However, in the example of FIG. 15, before the user actuation of the bow-down button 132, the starboard trim tab 114 was extended more than the port trim tab 112 by a difference in extension Δp. The difference in extension Δp may have been chosen to correct a list of the marine vessel 100 towards starboard by rolling the marine vessel 100 towards port, or for some other reason.

In the example of FIG. 15, in response to user actuation of the bow-down button 132, the trim-tab controller 186 causes both the trim tabs 112 and 114 to extend but maintains the difference in extension Δp between the trim tabs 112 and 114, at least until one of the trim tabs 112 and 114 (in this example, the starboard trim tab 114) reaches an end of its range of motion. Maintaining the difference in extension Δp may prevent any undesired change in roll in response to user actuation of the bow-down button 132. For example, if the difference in extension Δp was chosen to correct a list of the marine vessel 100 towards starboard by rolling the marine vessel 100 towards port, then maintaining the difference in extension Δp may maintain the correction to the list.

However, in the example of FIG. 15, if the user actuation of the bow-down button 132 persists for at least an override time 202 after one of the trim tabs 112 and 114 (in this example, the starboard trim tab 114) reaches an end of its range of motion, then the trim-tab controller 186 causes the other one of the trim tabs 112 and 114 (in this example, the port trim tab 112) to continue to extend to an end of its range of motion.

In other words, in some embodiments, in response to user input indicating an amount of change of pitch of the marine vessel, the trim-tab controller 186 may cause the trim tabs 112 and 114 to move according to the user input but maintain a difference in extension Δp, but if the user input persists for at least an override time 202 after one of the trim tabs 112 and 114 reaches an end of its range of motion, then the trim-tab controller 186 causes the other one of the trim tabs 112 and 114 to continue to move according to the user input until the other one of the trim tabs 112 and 114 reaches an end of its range of motion.

Figure 16:
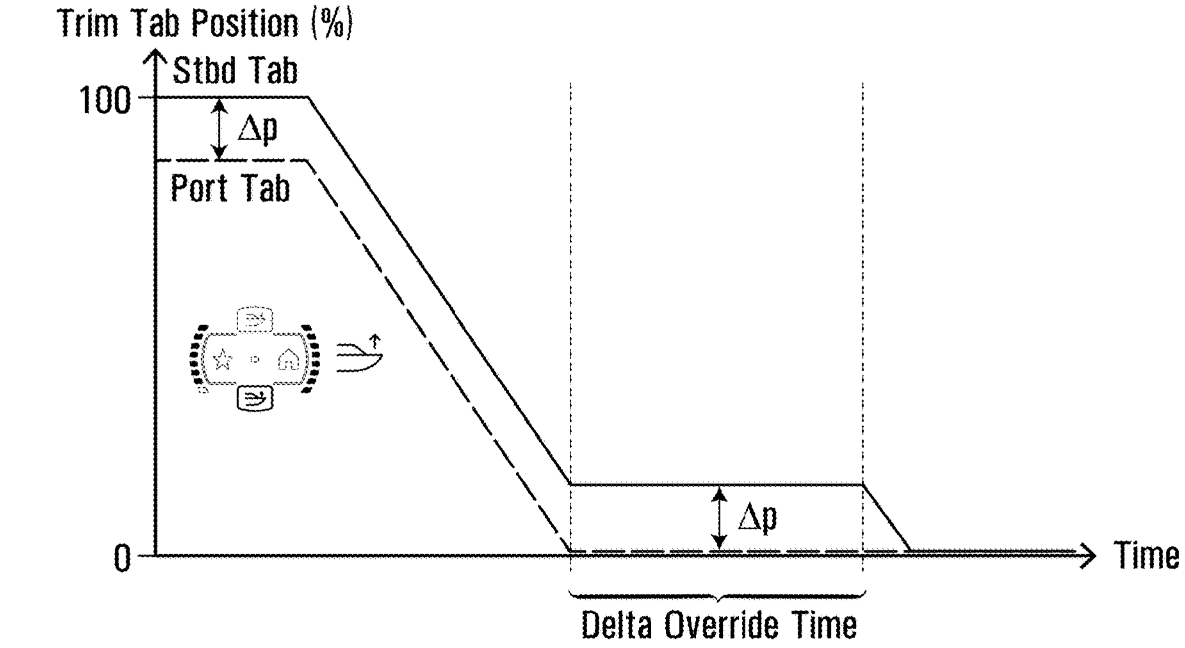

FIG. 16 illustrates another example. In the example of FIG. 16, in response to user actuation of the bow-up button 134, the trim-tab controller 186 causes both the trim tabs 112 and 114 to retract but maintains a difference in extension Δp between the trim tabs 112 and 114 at least until one of the trim tabs 112 and 114 (in this example, the port trim tab 112) reaches an end of its range of motion, but if the user actuation of the bow-up button 134 persists for at least an override time after the one of the trim tabs 112 and 114 (in this example, the port trim tab 112) reaches the end of its range of motion, then the trim-tab controller 186 causes the other one of the trim tabs 112 and 114 (in this example, the starboard trim tab 114) to continue to retract to an end of its range of motion. Therefore, the example of FIG. 16 is another example of causing movement of one or more trim tabs (the trim tabs 112 and 114 in that example) relative to the hull 102 and relative to the transom 108 in response to a single user input (namely user actuation of the bow-up button 134 in that example) indicating an amount of change of pitch of the marine vessel.

In general, an override time may prevent unintentional changes to roll while allowing an operator to extend or retract trim tabs by user actuation of a button for at least the override time.

As indicated above, a range of motion of a trim tab as described herein may be restricted only by possible motion of the trim tab, or may be configured (for example, user-configured by user configuration of a range-of-motion-end parameter) such that a retracted end of the range of motion of the trim tab may be a configured position relative to the hull 102 and relative to the transom 108 that is not as retracted as the most-retracted position relative to the hull 102 and relative to the transom 108 that is possible for the trim tab, an extended end of the range of motion of the trim tab may be a configured (for example, user-configured by user configuration of a range-of-motion-end parameter) position relative to the hull 102 and relative to the transom 108 that is not as extended as the most-extended position relative to the hull 102 and relative to the transom 108 that is possible for the trim tab, or both.

Figure 17:
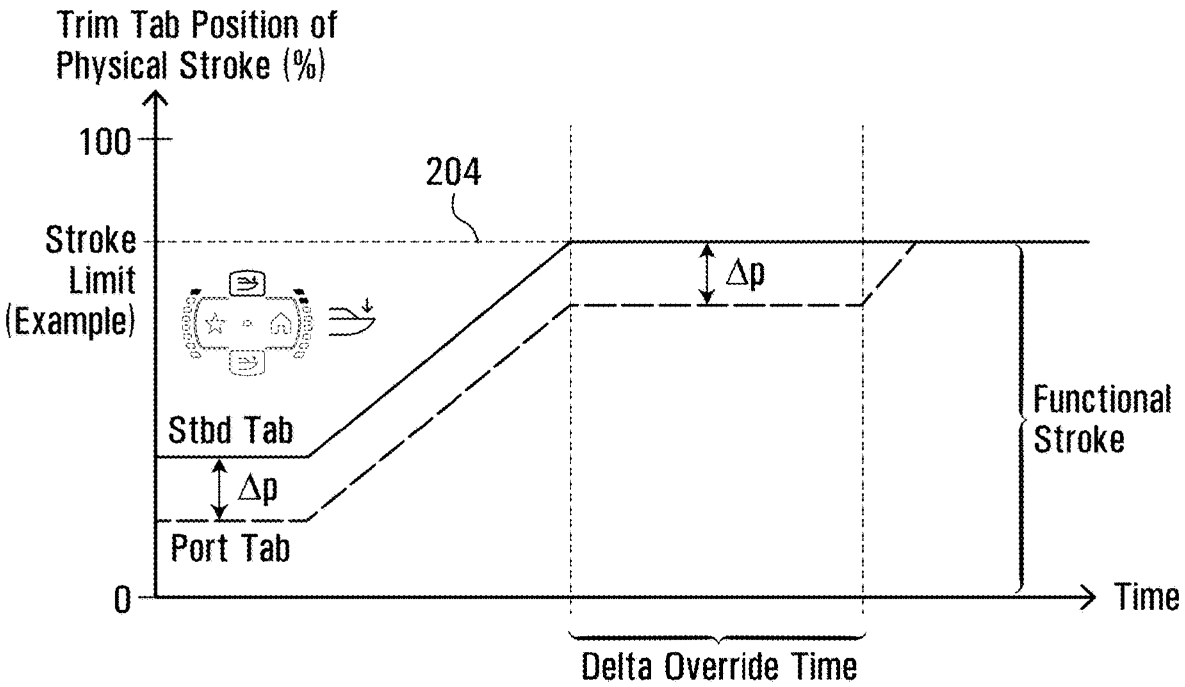

FIG. 17 illustrates another example. In the example of FIG. 17, an extended end of ranges of motion of the trim tabs 112 and 114 are a configured position 204 relative to the hull 102 and relative to the transom 108 that is not as extended as the most-extended position relative to the hull 102 and relative to the transom 108 that is possible for the trim tabs 112 and 114, and in response to user actuation of the bow-down button 132, the trim-tab controller 186 causes both the trim tabs 112 and 114 to extend but maintains a difference in extension Δp between the trim tabs 112 and 114 at least until one of the trim tabs 112 and 114 (in this example, the starboard trim tab 114) reaches the configured end of its range of motion, but if the user actuation of the bow-down button 132 persists for at least an override time after the one of the trim tabs 112 and 114 (in this example, the starboard trim tab 114) reaches the configured end of its range of motion, then the trim-tab controller 186 causes the other one of the trim tabs 112 and 114 (in this example, the port trim tab 112) to continue to retract to an end of its range of motion. Therefore, the example of FIG. 17 is another example of causing movement of one or more trim tabs (the trim tabs 112 and 114 in that example) relative to the hull 102 and relative to the transom 108 in response to a single user input (namely user actuation of the bow-down button 132 in that example) indicating an amount of change of pitch of the marine vessel.

Pitch Protection

Figure 18:
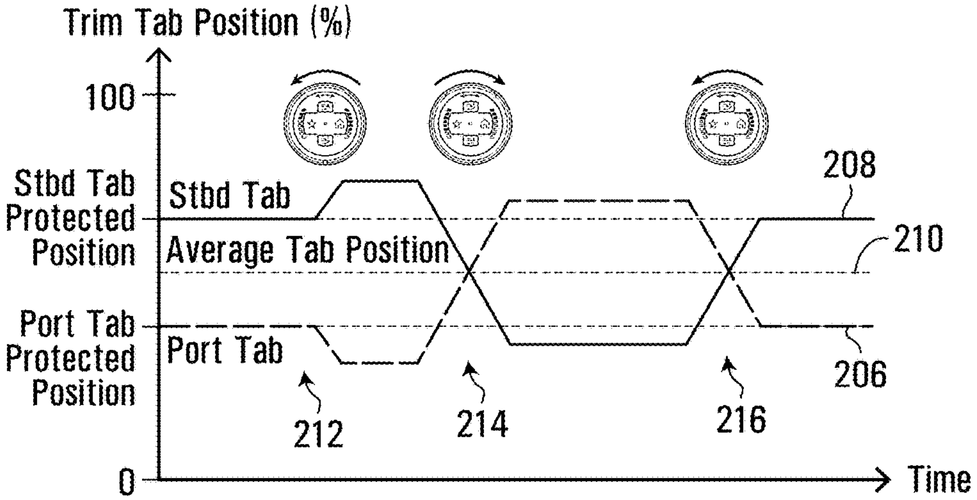

FIG. 18 illustrates an example of movement of the trim tabs 112 and 114 relative to the hull 102 and relative to the transom 108 under control of the trim-tab controller 186. In FIG. 18, a line 206 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 208 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

In the example of FIG. 18, an average amount of extension 210, which is an average of 1. an initial amount of extension of the port trim tab 112 in that example, and of
2. an initial amount of extension of the starboard trim tab 114 in that example, may have been chosen for a desired trim (or pitch) of the marine vessel 100, or for some other reason. In the example of FIG. 18, in response to user input involving counterclockwise rotation of the ring 130, the trim-tab controller 186 causes (as shown generally at 212) the port trim tab 112 to retract and the starboard trim tab 114 to extend. Thereafter, in the example of FIG. 18, in response to user input involving clockwise rotation of the ring 130, the trim-tab controller 186 causes (as shown generally at 214) the port trim tab 112 to extend and the starboard trim tab 114 to retract. Thereafter, in the example of FIG. 18, in response to user input involving counterclockwise rotation of the ring 130, the trim-tab controller 186 causes (as shown generally at 216) the port trim tab 112 to retract again and the starboard trim tab 114 to extend again. Therefore, the example of FIG. 18 is another example of causing movement of one or more trim tabs (the trim tabs 112 and 114 in that example) relative to the hull 102 and relative to the transom 108 in response to a single user input (namely user rotation of the ring 130 in that example) indicating an amount of change of roll of the marine vessel.

Throughout the example of FIG. 18, the trim-tab controller 186 causes the trim tabs 112 and 114 to maintain the same average amount of extension 210. Maintaining the same average amount of extension 210 may prevent any undesired change in pitch in response to user actuation of the ring 130. For example, if the average amount of extension 210 was chosen for a desired trim (or pitch) of the marine vessel 100, then maintaining the same average amount of extension 210 may maintain the desired trim (or pitch) of the marine vessel 100.

Virtual Positions

Figure 19:
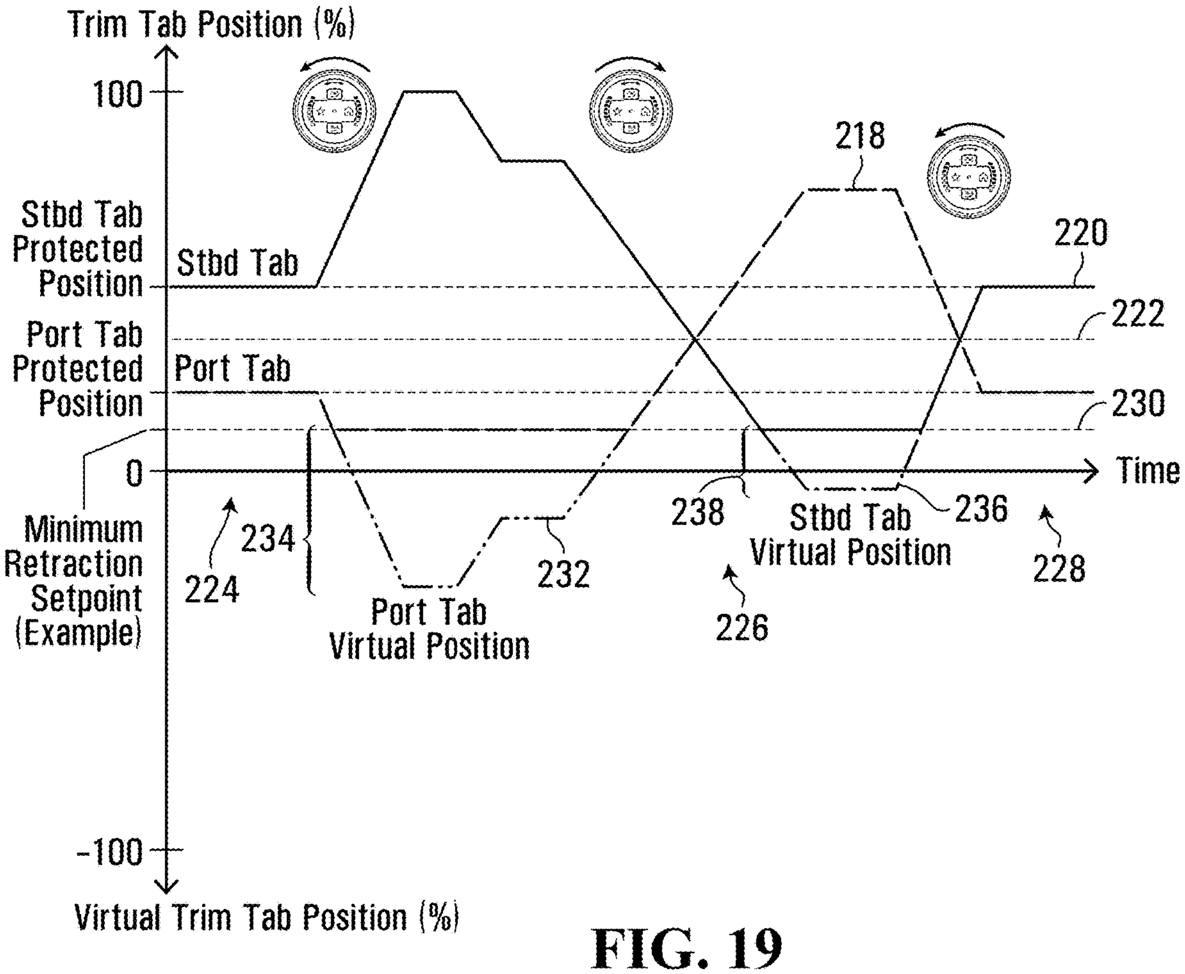

FIG. 19 illustrates another example of movement of the trim tabs 112 and 114 relative to the hull 102 and relative to the transom 108 under control of the trim-tab controller 186. In FIG. 19, a line 218 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 220 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

In the example of FIG. 19, an average amount of extension 222, which is an average of 1. an initial amount of extension of the port trim tab 112 in that example, and of
2. an initial amount of extension of the starboard trim tab 114 in that example, may have been chosen for a desired trim (or pitch) of the marine vessel 100, or for some other reason. In the example of FIG. 19, in response to user input (which may be a single user input, or which may not necessarily be a single user input and may more generally be a first user input) involving counterclockwise rotation of the ring 130, the trim-tab controller 186 causes (as shown generally at 224) the port trim tab 112 to retract and the starboard trim tab 114 to extend. Thereafter, in the example of FIG. 19, in response to user input (which may be a single user input, or which may not necessarily be a single user input and may more generally be a first or subsequent user input) involving clockwise rotation of the ring 130, the trim-tab controller 186 causes (as shown generally at 226) the port trim tab 112 to extend and the starboard trim tab 114 to retract. Thereafter, in the example of FIG. 19, in response to user input (which may be a single user input, or which may not necessarily be a single user input and may more generally be a subsequent user input) involving counterclockwise rotation of the ring 130, the trim-tab controller 186 causes (as shown generally at 228) the port trim tab 112 to retract again and the starboard trim tab 114 to extend again. Therefore, the example of FIG. 19 is another example of causing movement of one or more trim tabs (the trim tabs 112 and 114 in that example) relative to the hull 102 and relative to the transom 108 in response to a user input or a single user input (namely user rotation of the ring 130 in that example) indicating an amount of change of roll of the marine vessel.

However, in the example of FIG. 19, a retracted end of ranges of motion of the trim tabs 112 and 114 is a configured (for example, user-configured by user configuration of a range-of-motion-end parameter) position 230 relative to the hull 102 and relative to the transom 108 that is not as retracted as the most-retracted position relative to the hull 102 and relative to the transom 108 that is possible for the trim tabs 112 and 114, and maintaining the same average amount of extension 222 when extending the starboard trim tab 114 at 224 would require retracting the port trim tab 112 beyond the configured position 230. In that example, in response to the user input involving the counterclockwise rotation of the ring 130 at 224, the trim-tab controller 186 does not cause the port trim tab 112 to retract beyond the configured position 230, but the trim-tab controller 186 determines virtual positions 232 of the port trim tab 112 relative to the hull 102 and relative to the transom 108. The virtual positions 232 of the port trim tab 112 relative to the hull 102 and relative to the transom 108 are positions of the port trim tab 112 relative to the hull 102 and relative to the transom 108 that would maintain the same average amount of extension 222.

Such virtual positions may not be possible. For example, as shown in FIG. 19, some of the virtual positions 232 of the port trim tab 112 are less than 0%, which may not be possible. Nevertheless, determining such virtual positions may facilitate maintaining the same average amount of extension 222, for example to maintain the desired trim (or pitch) of the marine vessel 100.

For example, as shown in FIG. 19, in response to the user input involving the clockwise rotation of the ring 130 at 226, the trim-tab controller 186 causes the port trim tab 112 to extend from the configured position 230 once the port trim tab 112 can extend from the configured position 230 while maintaining the same average amount of extension 222.

In other words, the example of FIG. 19 involves:

1. in response a first user input or a single user input (counterclockwise rotation of the ring 130 at 224) indicating an amount of change of roll of the marine vessel 100 in a first direction (towards port), causing the starboard trim tab 114 (a first trim tab on a first side of the marine vessel 100) to move more than the port trim tab 112 (a second trim tab on a second side of the marine vessel opposite the first side of the marine vessel) by a difference 234 (shown in FIG. 19 as the amount of movement of the port trim tab 112 in the virtual positions 232 from the configured position 230) between the movements of the trim tabs 112 and 114; and
2. in response to subsequent user input (clockwise rotation of the ring 130 at 226) indicating a subsequent amount of change of roll of the marine vessel 100 in a second direction (towards starboard) opposite the first direction, causing the starboard trim tab 114 (or the first trim tab) to move more than the port trim tab 112 (or the second trim tab) by the difference 234.

Reference to such a difference between movements of two trim tabs does not necessarily imply movement of both such trim tabs. For example, for a period of time in the example of FIG. 19, the starboard trim tab 114 moves while the port trim tab 112 does not. During such a period of time, the starboard trim tab 114 moves more than the port trim tab 112 by a difference between movements of the trim tabs 112 and 114 although the port trim tab 112 does not actually move.

Further, in the example of FIG. 19, maintaining the same average amount of extension 222 when extending the port trim tab 112 at 226 would require retracting the starboard trim tab 114 beyond the configured position 230. In that example, in response to the user input involving the clockwise rotation of the ring 130 at 226, the trim-tab controller 186 does not cause the starboard trim tab 114 to retract beyond the configured position 230, but the trim-tab controller 186 determines virtual positions 236 of the starboard trim tab 114 relative to the hull 102 and relative to the transom 108. The virtual positions 236 of the starboard trim tab 114 relative to the hull 102 and relative to the transom 108 are positions of the starboard trim tab 114 relative to the hull 102 and relative to the transom 108 that would maintain the same average amount of extension 222, and also may not be possible, but may facilitate maintaining the same average amount of extension 222, for example to maintain the desired trim (or pitch) of the marine vessel 100.

For example, as shown in FIG. 19, in response to the user input involving the counterclockwise rotation of the ring 130 at 228, the trim-tab controller 186 causes the starboard trim tab 114 to extend from the configured position 230 once the starboard trim tab 114 to can extend from the configured position 230 while maintaining the same average amount of extension 222.

In other words, the example of FIG. 19 also involves:

1. in response a first user input or a single user input (clockwise rotation of the ring 130 at 226) indicating an amount of change of roll of the marine vessel 100 in a first direction (towards starboard), causing the port trim tab 112 (a first trim tab on a first side of the marine vessel 100) to move more than the starboard trim tab 114 (a second trim tab on a second side of the marine vessel opposite the first side of the marine vessel) by a difference 238 (shown in FIG. 19 as the amount of movement of the starboard trim tab 114 in the virtual positions 236 from the configured position 230) between the movements of the trim tabs 112 and 114; and
2. in response to subsequent user input (counterclockwise rotation of the ring 130 at 228) indicating a subsequent amount of change of roll of the marine vessel 100 in a second direction (towards port) opposite the first direction, causing the port trim tab 112 (or the first trim tab) to move more than the starboard trim tab 114 (or the second trim tab) by the difference 238.

Again, reference to such a difference between movements of two trim tabs does not necessarily imply movement of both such trim tabs.

Of course FIG. 19 is an example only, and alternative embodiments may differ. For example, the example of FIG. 19 involves virtual positions beyond a configured position 230 defining a retracted end of ranges of motion of the trim tabs 112 and 114. However, in other embodiments, virtual positions may additionally or alternatively extend beyond an extended end of ranges of motion of the trim tabs 112 and 114. Further, in other embodiments, virtual positions may extend beyond one or both ends of possible motion of the trim tabs 112 and 114 without necessarily any configured positions.

Further, the example of FIG. 19 involves a first trim tab moving more than a second trim tab by a difference between the movements of the first and second trim tabs in response to a first user input or a single user input indicating an amount of change of roll in a first direction, and then the first trim tab moving more than the second trim tab by the difference in response to a subsequent user input indicating an amount of change of roll in a second direction opposite the first direction. However, in other embodiments, the first trim tab may move more than the second trim tab (but not necessarily by the difference, and for example by more or less than the difference) in response to such a subsequent user input.

In the examples of FIG. 18 and FIG. 19, one or more computer-readable and/or computer-writable storage media in the processor circuit 192 may store one or more storage codes representing the initial positions of the trim tabs 112 and 114 as protected positions, for example for possible future use. For example, after a roll adjustment as shown in FIG. 18 or FIG. 19 for example, the user may wish to return the trim tabs 112 and 114 to their initial positions before the roll adjustment. Storing such initial positions before a roll adjustment as protected positions may facilitate returning the trim tabs 112 and 114 to such initial positions after the roll adjustment.

The example of FIG. 19 illustrates virtual positions to maintain an average amount of extension in response to user inputs indicating amounts of change of roll of the marine vessel 100, for example to maintain a desired trim (or pitch)

of the marine vessel 100. However, in other embodiments, virtual positions may maintain a difference in extension Δp (as shown in FIG. 15 to FIG. 17, for example) in response to user inputs indicating amounts of change of pitch of the marine vessel 100, for example to maintain a correction to a list of the marine vessel 100.

Figure 20:
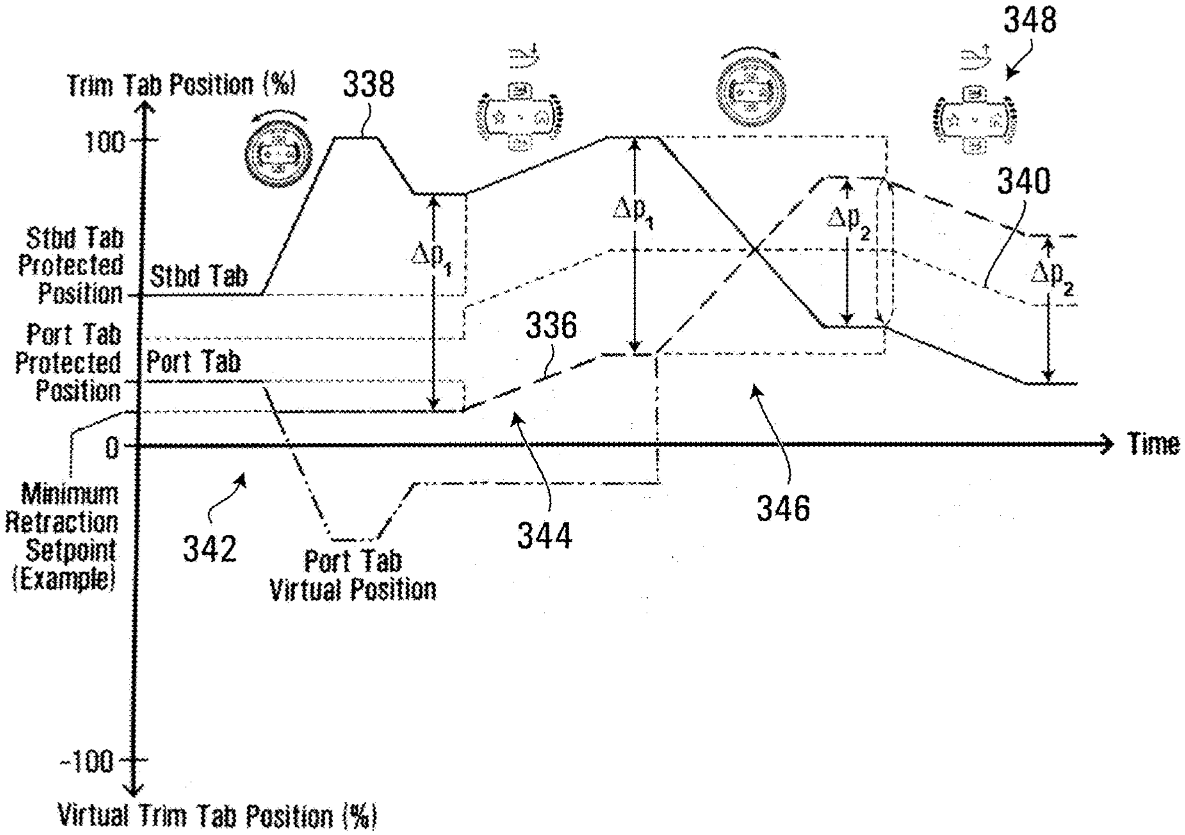

For example, FIG. 20 illustrates another example of movement of the trim tabs 112 and 114 relative to the hull 102 and relative to the transom 108 under control of the trim-tab controller 186. In FIG. 20, a line 336 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 338 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114). Further, in the example of FIG. 20, an average amount of extension 340 is an average of an amount of extension of the port trim tab 112 and of an amount of extension of the starboard trim tab 114.

In the example of FIG. 20, in response to user input involving counterclockwise rotation of the ring 130, the trim-tab controller 186 causes (as shown generally at 342) the port trim tab 112 to retract and the starboard trim tab 114 to extend. Maintaining the same average amount of extension 340 when extending the starboard trim tab 114 at 342 would require retracting the port trim tab 112 beyond a minimum retraction point (which may be configured as described above, for example). Therefore, in that example, in response to the user input involving the counterclockwise rotation of the ring 130 at 342, the trim-tab controller 186 does not cause the port trim tab 112 to retract beyond the minimum retraction point, but rather determines virtual positions of the port trim tab 112 relative to the hull 102 and relative to the transom 108 (as shown in FIG. 20) that would maintain the same average amount of extension.

Thereafter, in the example of FIG. 20, in response to user actuation of the bow-down button 132, the trim-tab controller 186 does not maintain virtual positions of the port trim tab 112 relative to the hull 102 and relative to the transom 108, but rather causes (as shown generally at 344) both the trim tabs 112 and 114 to extend to maintain a difference in extension $\Delta p_1$ between the trim tabs 112 and 114. Maintaining the difference in extension $\Delta p_1$ between the trim tabs 112 and 114 may prevent unintended roll from resulting from the user actuation of the bow-down button 132.

Thereafter, in the example of FIG. 20, in response to user input involving clockwise rotation of the ring 130, the trim-tab controller 186 causes (as shown generally at 346) the port trim tab 112 to extend and the starboard trim tab 114 to retract, resulting in a new difference in extension $\Delta p_2$ between the trim tabs 112 and 114. Thereafter, in the example of FIG. 20, in response to user actuation of the bow-up button 134, the trim-tab controller 186 causes (as shown generally at 348) both the trim tabs 112 and 114 to retract but maintains the difference in extension $\Delta p_2$ between the trim tabs 112 and 114.

Figure 21:
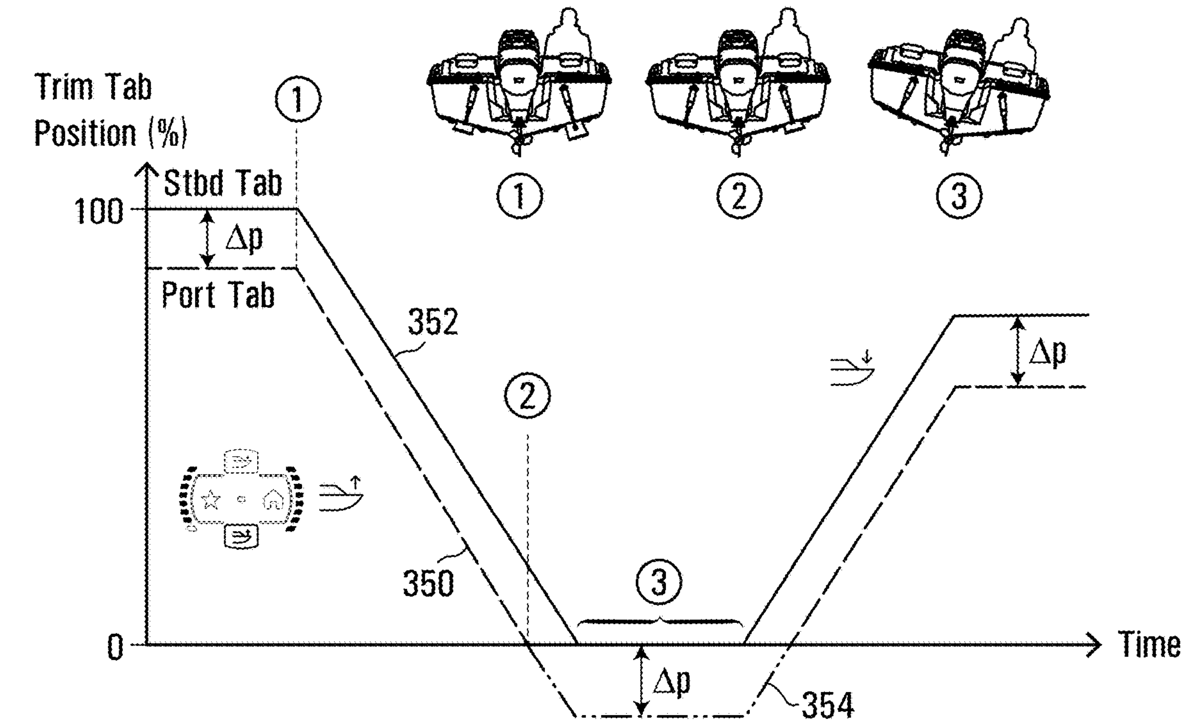

However, alternative embodiments may differ. For example, FIG. 21 illustrates another example of movement of the trim tabs 112 and 114 relative to the hull 102 and relative to the transom 108 under control of the trim-tab controller 186. In FIG. 21, a line 350 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 352 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

In the example of FIG. 21, in response to user actuation of the bow-up button 134, the trim-tab controller 186 causes both the trim tabs 112 and 114 to retract but maintains a difference in extension Δp between the trim tabs 112 and 114 at least until one of the trim tabs 112 and 114 (in this example, the port trim tab 112) reaches an end of its range of motion. In the example of FIG. 21, the end of the range of motion is an end of possible motion, although the end of the range of motion may be configured (as described above, for example) in some embodiments. The difference in extension Δp may have been chosen to correct a list of the marine vessel 100 towards starboard by rolling the marine vessel 100 towards port, or for some other reason. At points in time indicated by 1 and 2 in FIG. 21, the difference in extension Δp between the trim tabs 112 and 114 is maintained, so the marine vessel 100 is shown without a list.

The trim-tab controller 186 does not cause the port trim tab 112 to retract beyond the end of its range of motion, but the trim-tab controller 186 determines virtual positions 354 of the port trim tab 112 relative to the hull 102 and relative to the transom 108. The virtual positions 354 of the port trim tab 112 relative to the hull 102 and relative to the transom 108 are positions of the port trim tab 112 relative to the hull 102 and relative to the transom 108 that would maintain the same difference in extension Δp. Because the difference in extension Δp is not maintained at a range in time indicated by 3 in FIG. 21, the trim tabs 112 and 114 no longer correct a starboard list by rolling the marine vessel 100 towards port, so the marine vessel 100 is shown with a list towards starboard.

Thereafter, in the example of FIG. 21, in response to user actuation of the bow-down button 132, the trim-tab controller 186 causes the trim tab 114 to extend, and causes the trim tab 112 to extend once the trim tab 112 can extend while maintaining the difference in extension Δp.

In other words, the example of FIG. 21 involves:

1. in response a first user input or a single user input (user actuation of the bow-up button 134) indicating an amount of change of pitch of the marine vessel 100 in a first direction (trim up), causing the starboard trim tab 114 (a first trim tab on a first side of the marine vessel 100) to move more than the port trim tab 112 (a second trim tab on a second side of the marine vessel opposite the first side of the marine vessel) by a difference (shown in FIG. 21 as the amount of movement of the port trim tab 112 in the virtual positions 354) between the movements of the trim tabs 112 and 114; and
2. in response to subsequent user input (user actuation of the bow-down button 132) indicating a subsequent amount of change of pitch of the marine vessel 100 in a second direction (trim down) opposite the first direction, causing the starboard trim tab 114 (or the first trim tab) to move more than the port trim tab 112 (or the second trim tab) by the difference.

Again, reference to such a difference between movements of two trim tabs does not necessarily imply movement of both such trim tabs. Also, in other embodiments, the first trim tab may move more than the second trim tab (but not necessarily by the difference, and for example by more or less than the difference) in response to such a subsequent user input.

The example of FIG. 20 includes protected positions shown in dashed lines as in the examples of FIG. 18 and FIG. 19 as described above.

The example of FIG. 21 does not involve an override as in the examples of FIG. 15 to FIG. 17. However, other embodiments may include such an override.

Figure 22:
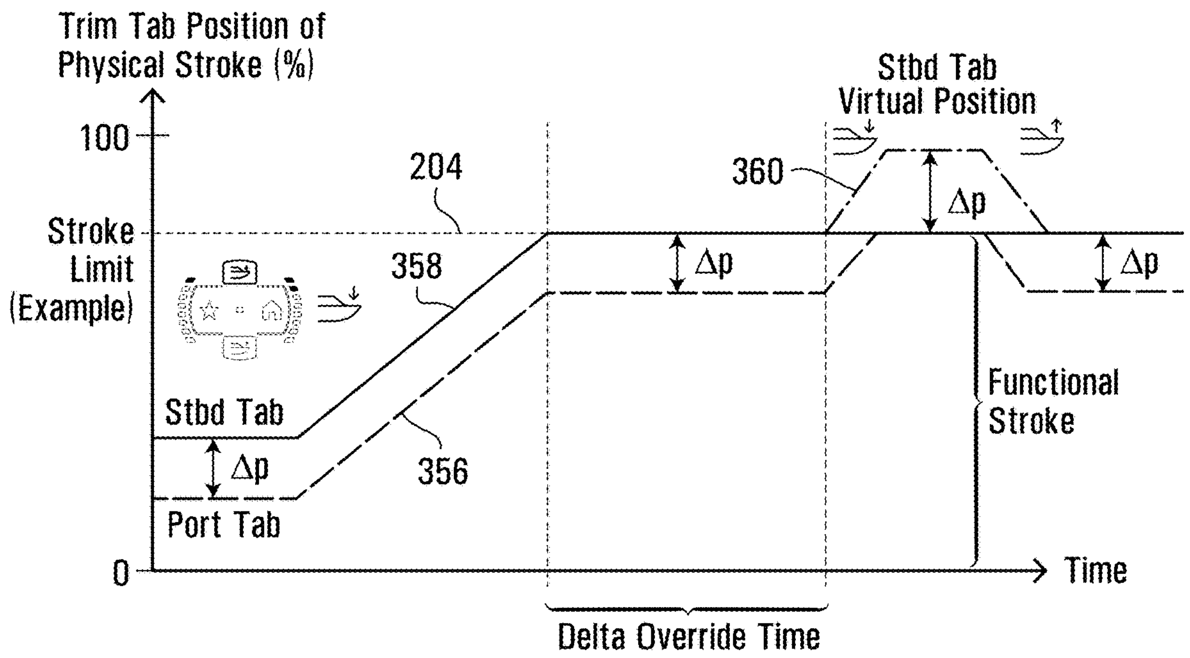

For example, FIG. 22 illustrates another example of movement of the trim tabs 112 and 114 relative to the hull 102 and relative to the transom 108 under control of the trim-tab controller 186. In FIG. 22, a line 356 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 358 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

In the example of FIG. 22, in response to user actuation of the bow-down button 132, the trim-tab controller 186 causes both the trim tabs 112 and 114 to extend but maintains a difference in extension Δp between the trim tabs 112 and 114 at least until one of the trim tabs 112 and 114 (in this example, the starboard trim tab 114) reaches an end of its range of motion. In the example of FIG. 22, the end of the range of motion is configured (as described above, for example), although the end of the range of motion may be an end of possible motion in some embodiments. The difference in extension Δp may have been chosen to correct a list of the marine vessel 100 towards starboard by rolling the marine vessel 100 towards port, or for some other reason, and maintaining the difference in extension Δp may prevent any undesired change in roll in response to user actuation of the bow-down button 132.

However, in the example of FIG. 22, if the user actuation of the bow-down button 132 persists for at least an override time after one of the trim tabs 112 and 114 (in this example, the starboard trim tab 114) reaches an end of its range of motion, then the trim-tab controller 186 causes the other one of the trim tabs 112 and 114 (in this example, the port trim tab 112) to continue to extend to an end of its range of motion, and the trim-tab controller 186 determines virtual positions 360 of the starboard trim tab 114 relative to the hull 102 and relative to the transom 108. The virtual positions 360 of the starboard trim tab 114 relative to the hull 102 and relative to the transom 108 are positions of the starboard trim tab 114 relative to the hull 102 and relative to the transom 108 that would maintain the same difference in extension Δp.

Thereafter, in the example of FIG. 22, in response to user actuation of the bow-up button 134, the trim-tab controller 186 causes the trim tab 112 to retract, and causes the trim tab 114 to retract once the trim tab 114 can retract while maintaining the difference in extension Δp.

In other words, the example of FIG. 22 involves:

1. in response a first user input or a single user input (user actuation of the bow-down button 132) indicating an amount of change of pitch of the marine vessel 100 in a first direction (trim down), causing the port trim tab 112 (a first trim tab on a first side of the marine vessel 100) to move more than the starboard trim tab 114 (a second trim tab on a second side of the marine vessel opposite the first side of the marine vessel) by a difference (shown in FIG. 22 as the amount of movement of the starboard trim tab 114 in the virtual positions 360) between the movements of the trim tabs 112 and 114; and
2. in response to subsequent user input (user actuation of the bow-up button 134) indicating a subsequent amount of change of pitch of the marine vessel 100 in a second direction (trim up) opposite the first direction, causing the port trim tab 112 (or the first trim tab) to move more than the starboard trim tab 114 (or the second trim tab) by the difference.

Again, reference to such a difference between movements of two trim tabs does not necessarily imply movement of both such trim tabs. Also, in other embodiments, the first trim tab may move more than the second trim tab (but not necessarily by the difference, and for example by more or less than the difference) in response to such a subsequent user input.

User-Configurable Sensitivity Settings

In the examples described above, one or more trim tabs may move relative to the hull 102 and relative to the transom 108 by an amount indicated by (or proportionate to) a duration of user actuation of a button (or, more generally, a duration of a single user input), and the one or more trim tabs may move relative to the hull 102 and relative to the transom 108 by an amount indicated by (or proportionate to) an amount of rotation of the ring 130.

However, in some embodiments, amounts of movement of one or more trim tabs relative to a hull of a marine vessel may also be indicated by a user-configurable sensitivity setting. For example, such a user-configurable sensitivity setting may be configured by a user using the configuration interface 194 to cause one or more computer-readable and/or computer-writable storage media in the processor circuit 192 to store one or more storage codes representing the user-configurable sensitivity setting.

Figure 23:
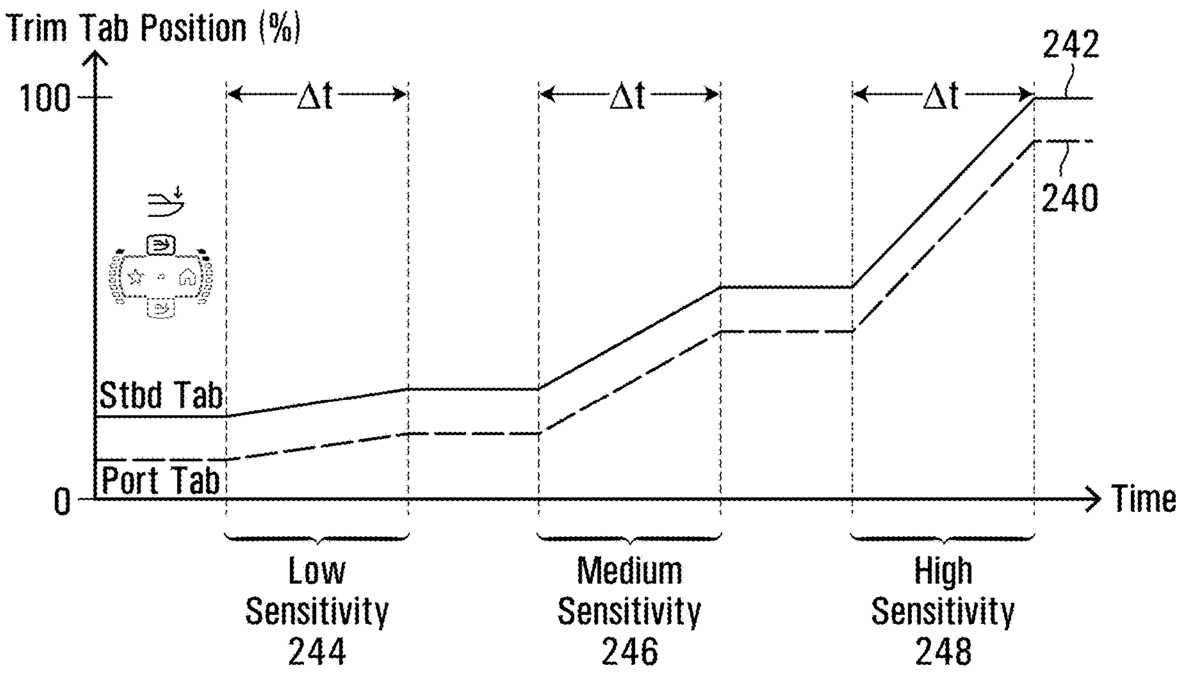

FIG. 23 illustrates an example of movement of the trim tabs 112 and 114 relative to the hull 102 and relative to the transom 108 under control of the trim-tab controller 186 at different user-configurable sensitivity settings. In FIG. 23, a line 240 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 242 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

As shown in FIG. 23, in that example, in response to user actuation of the bow-down button 132 by a particular amount (such as for a particular duration that may be some or all of a particular amount of time Δt, for example) when the user-configurable sensitivity setting is low, the trim-tab controller 186 causes both the trim tabs 112 and 114 to extend as shown at 244 at a relatively slow rate during the amount of time Δt.

As also shown in FIG. 23, in that example, in response to user actuation of the bow-down button 132 by the same particular amount (for example, for the same particular duration) when the user-configurable sensitivity setting is medium, the trim-tab controller 186 causes both the trim tabs 112 and 114 to extend as shown at 246 at a relatively medium rate greater than the relatively slow rate and by a greater amount than as shown at 244.

As also shown in FIG. 23, in that example, in response to user actuation of the bow-down button 132 by the same particular amount (for example, for the same particular duration) when the user-configurable sensitivity setting is high, the trim-tab controller 186 causes both the trim tabs 112 and 114 to extend as shown at 248 at a relatively high rate greater than the relatively medium rate and by a greater amount than as shown at 246.

Therefore, the example of FIG. 23 is another example of causing movement of one or more trim tabs (the trim tabs 112 and 114 in that example) relative to the hull 102 and relative to the transom 108 in response to a single user input (namely user actuation of the bow-down button 132 in that example) indicating an amount of change of pitch of the marine vessel.

Figure 24:
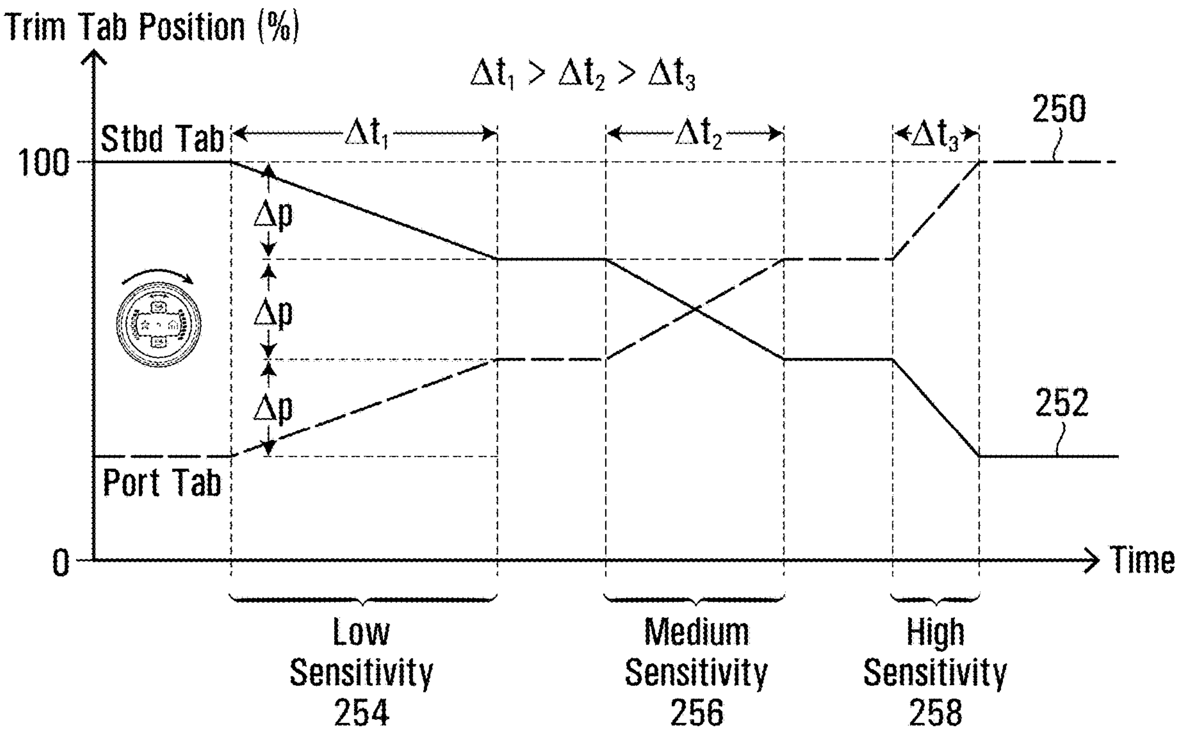

FIG. 24 illustrates another example of movement of the trim tabs 112 and 114 relative to the hull 102 and relative to the transom 108 under control of the trim-tab controller 186 at different user-configurable sensitivity settings. In FIG. 24, a line 250 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 252 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

As shown in FIG. 24, in that example, in response to user input involving clockwise rotation of the ring 130 by a particular amount (for example, by a particular number of discrete rotational positions relative to the dashboard 120 and relative to the front face 128) when the user-configurable sensitivity setting is low as shown at 254, the trim-tab controller 186 causes the port trim tab 112 to extend at a relatively slow rate by an amount Δp during an amount of time $\Delta t_1$, and causes the starboard trim tab 114 to retract at the same relatively slow rate by the same amount Δp during the same amount of time $\Delta t_1$.

As also shown in FIG. 24, in that example, in response to user input involving clockwise rotation of the ring 130 by the same particular amount (for example, by the same particular number of discrete rotational positions relative to the dashboard 120 and relative to the front face 128) when the user-configurable sensitivity setting is medium as shown at 256, the trim-tab controller 186 causes the port trim tab 112 to extend at a relatively medium rate greater than the relatively slow rate and by the same amount Δp during an amount of time 412 less than the amount of time $\Delta t_1$, and causes the starboard trim tab 114 to retract at the same relatively medium rate by the same amount Δp during the same amount of time 412.

As also shown in FIG. 24, in that example, in response to user input involving clockwise rotation of the ring 130 by the same particular amount (for example, by the same particular number of discrete rotational positions relative to the dashboard 120 and relative to the front face 128) when the user-configurable sensitivity setting is high as shown at 258, the trim-tab controller 186 causes the port trim tab 112 to extend at a relatively high rate greater than the relatively medium rate and by the same amount Δp during an amount of time 413 less than the amount of time 412, and causes the starboard trim tab 114 to retract at the same relatively high rate by the same amount Δp during the same amount of time 413.

Therefore, the example of FIG. 24 is another example of causing movement of one or more trim tabs (the trim tabs 112 and 114 in that example) relative to the hull 102 and relative to the transom 108 in response to a single user input (namely user rotation of the ring 130 in that example) indicating an amount of change of roll of the marine vessel.

Home Button

Figure 25:
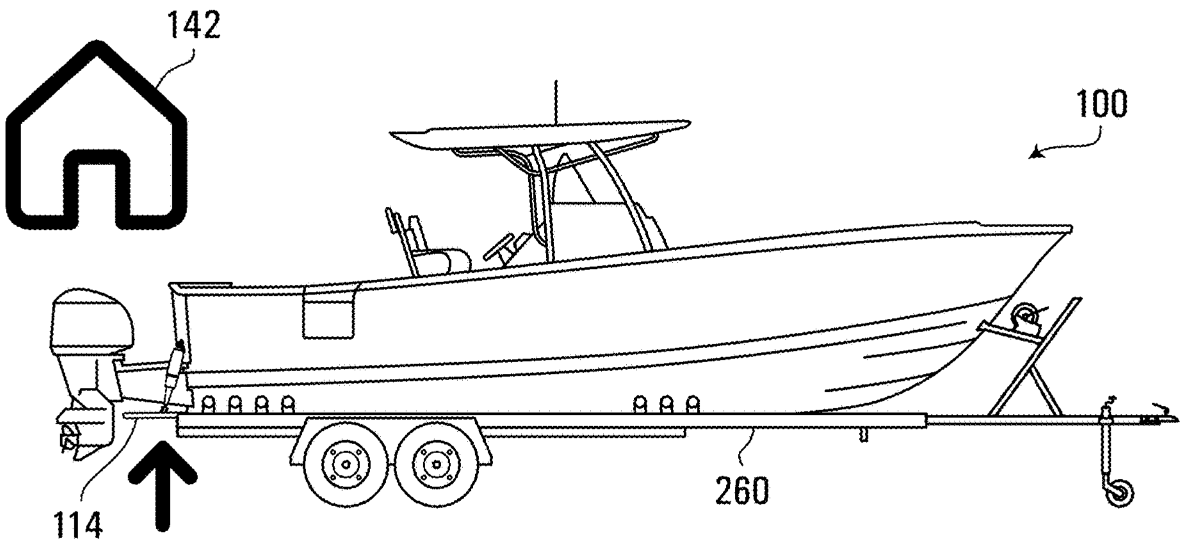
FIG. 25 is a side view of the marine vessel of FIG. 1 on a boat trailer according to one embodiment.

Referring to FIG. 25, in response to user actuation of the home button 142, the trim-tab controller 186 may cause the trim tabs 112 and 114 to retract, for example to the retracted ends of the ranges of motion of the trim tabs 112 and 114, which may facilitate loading the marine vessel 100 onto a boat trailer 260 as shown in FIG. 25, for example. In some embodiments, the status indicator 144 may indicate that the trim tabs 112 and 114 have retracted in response to user actuation of the home button 142.

Stored Trim-Tab Positions

In some embodiments, the trim-tab controller 186 may identify, store, and implement cruising-favorite positions of the trim tabs 112 and 114 relative to the hull 102 and relative to the transom 108 automatically (for example, without specific user input indicating identifying, storing, or implementing such cruising-favorite positions).

Figure 26:
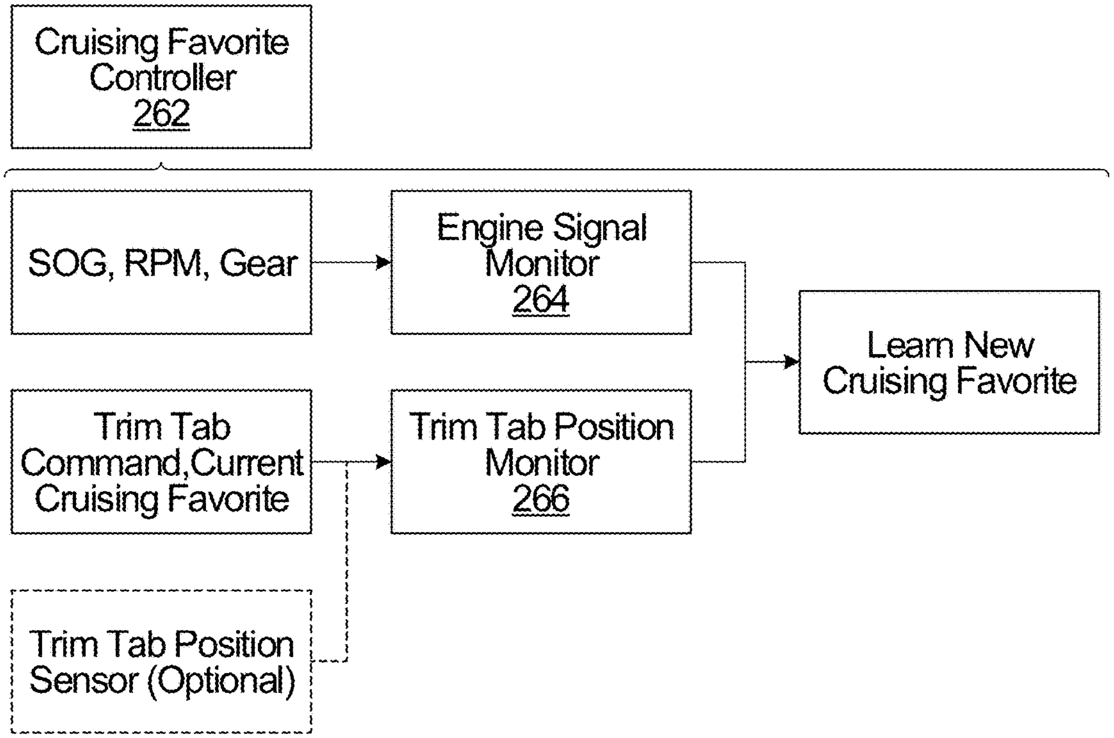
FIG. 26 is a schematic illustration of a cruising-favorite controller that may be implemented by the trim-tab controller of FIG. 10.

Referring to FIG. 26, the trim-tab controller 186 may implement a cruising-favorite controller 262 including an engine-signal monitor 264 and a trim-tab-position monitor 268.

As shown in FIG. 26, the engine-signal monitor 264 may receive one or more signals representing measured speed over ground (SOG), for example from the global positioning system (GPS) sensor 188 or from another boat-speed sensor. The engine-signal monitor 264 may also receive one or more signals representing a measured engine-rotation speed (or, more generally, measured engine output from at least one engine) of the outboard motor 110, for example in revolutions per minute (RPM), and for example from the engine-speed sensor 190. The engine-signal monitor 264 may also receive one or more signals representing a gear status of the outboard motor 110, for example indicating whether gears of the outboard motor 110 are configured to cause the outboard motor 110 to generate a forward thrust force, to generate a reverse thrust force, or to be in neutral without exerting a thrust force.

As also shown in FIG. 26, the trim-tab-position monitor 266 may receive one or more signals indicating one or more user inputs (or commands) to cause the tabs 112 and 114 to move relative to the hull 102 and relative to the transom 108, for example using the trim-tab-input device 126. The trim-tab-position monitor 266 may also receive one or more signals indicating previously stored cruising-favorite positions of the trim tabs 112 and 114, for example according to one or more storage codes that may be stored in one or more computer-readable and/or computer-writable storage media in the processor circuit 192.

As indicated above, in some embodiments, the port actuator 116 may include a position sensor indicating an amount of extension of the port actuator 116, which may indicate a position of the port trim tab 112 relative to the hull 102 and relative to the transom 108, and the starboard actuator 118 may include a position sensor indicating an amount of extension of the starboard actuator 118, which may indicate a position of the starboard trim tab 114 relative to the hull 102 and relative to the transom 108. In such embodiments, the trim-tab-position monitor 266 may also receive one or more signals indicating positions of the tabs 112 and 114 relative to the hull 102 and relative to the transom 108.

Figure 27:
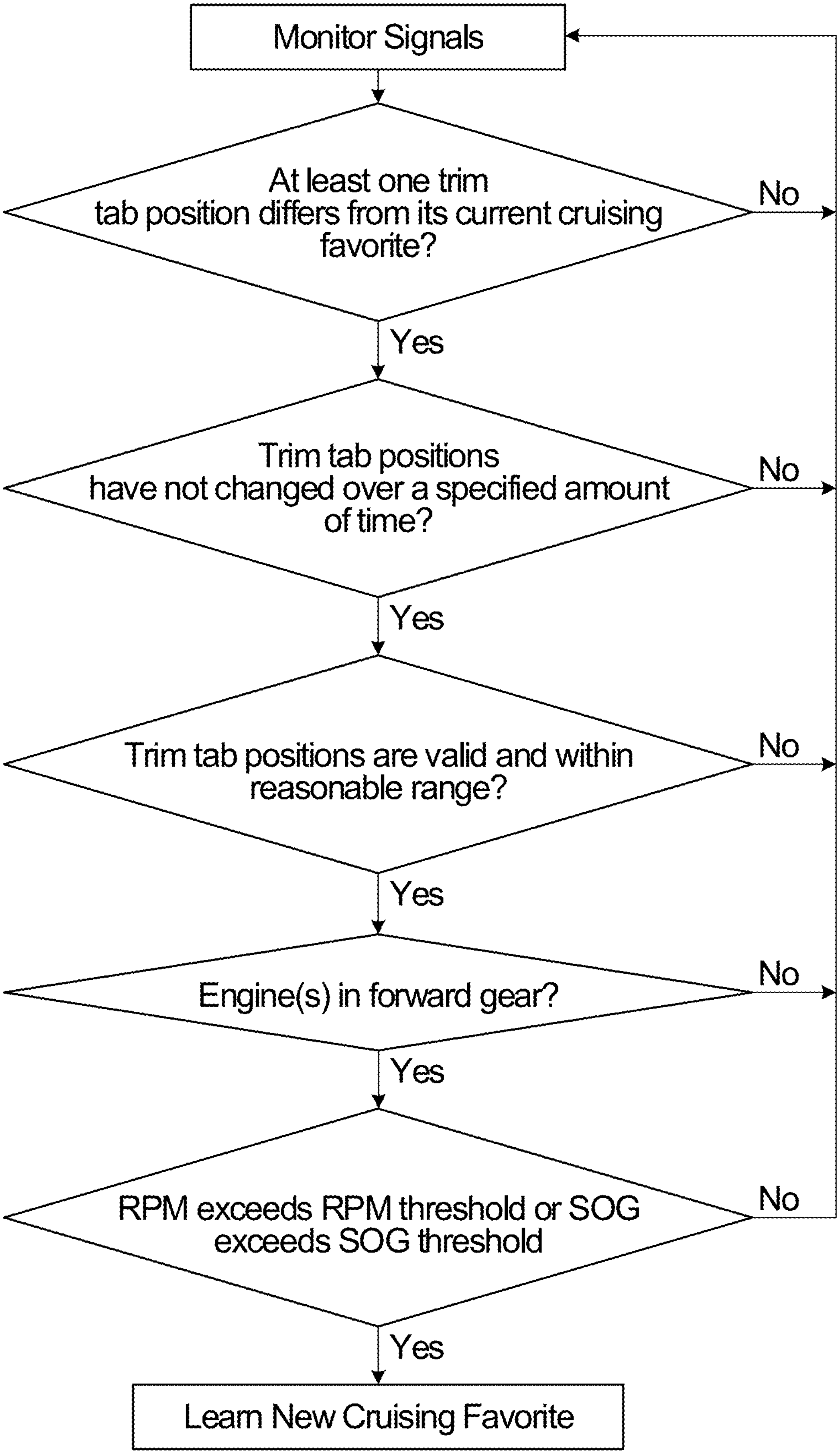
FIG. 27 is a schematic illustration of a method that may be implemented by the cruising-favorite controller of FIG. 26.

Using one or more signals from the engine-signal monitor 264 and from the trim-tab-position monitor 266, the cruising-favorite controller 262 may identify new cruising-favorite positions of the trim tabs 112 and 114 relative to the hull 102 and relative to the transom 108 automatically (for example, without specific user input indicating identifying such cruising-favorite positions), and FIG. 27 illustrates a method that the cruising-favorite controller 262 may implement to identify new cruising-favorite positions of the trim tabs 112 and 114 relative to the hull 102 and relative to the transom 108 automatically. For example, one or more computer-readable storage media in the processor circuit 192 may store program codes that, when executed, cause the processor circuit 192 to implement the method of FIG. 27 or other functions as described herein, for example, in which case the processor circuit 192 may be programmed, configured, or operable to implement such functions.

As shown in FIG. 27, the cruising-favorite controller 262 may periodically monitor one or more signals from the engine-signal monitor 264 and from the trim-tab-position monitor 266, and if 1. at least one of the trim tabs 112 and 114 has a position relative to the hull 102 and relative to the transom 108 that differs from the previously stored cruising-favorite position of the trim tab,
2. positions of the trim tabs 112 and 114 relative to the hull 102 and relative to the transom 108 have not changed for at least a predetermined or specified period of time,
3. positions of the trim tabs 112 and 114 relative to the hull 102 and relative to the transom 108 are valid and within a reasonable range of cruising positions,
4. the outboard motor 110 (or, more generally, one or more engines) are configured to generate a forward thrust force, and
5. either
    a. engine output of the outboard motor 110 (or, more generally, one or more engines) is above a predetermined or specified engine-output threshold (for example, a measured engine-rotation speed of the outboard motor 110 is above a predetermined or specified engine-rotation-speed threshold), or
    b. measured speed over ground of the marine vessel 100 is above a predetermined or specified threshold of measured speed then the cruising-favorite controller 262 may store the current positions of the trim tabs 112 and 114 position relative to the hull 102 and relative to the transom 108 as new cruising-favorite positions, for example by causing one or more storage codes representing the current positions of the trim tabs 112 and 114 relative to the hull 102 and relative to the transom 108 to be stored in one or more computer-readable and/or computer-writable storage media in the processor circuit 192.

In other words, in response to at least one criterion (such as one or more of the criteria as shown in FIG. 27 or as described above, for example), the cruising-favorite controller 262 may cause identifications of positions of the trim tabs 112 and 114 to be stored in at least one storage memory, such that the at least one storage memory may store identifications of cruising-favorite positions of the trim tabs 112 and 114.

Herein, "predetermined" does not necessarily mean constant or fixed, but can include user-configured values.

Of course the cruising-favorite controller 262 and the method of FIG. 27 are examples only, and alternative embodiments may differ. For example, in alternative embodiments, new cruising-favorite positions of the trim tabs 112 and 114 relative to the hull 102 and relative to the transom 108 may be identified in response to more, fewer, or different criteria.

Further, the cruising-favorite controller 262 may control the actuators 116 and 118 to cause the trim tabs 112 and 114 to move to the cruising-favorite positions automatically (for example, without specific user input indicating moving the trim tabs 112 and 114 to the cruising-favorite positions). For example, in response to measured speed over ground of the marine vessel 100 above a predetermined or specified threshold of measured speed, or more generally in response to measurement of movement of the marine vessel above a movement threshold, the cruising-favorite controller 262 may automatically (for example, without specific user input indicating moving the trim tabs 112 and 114 to the cruising-favorite positions) control the actuators 116 and 118 to cause the trim tabs 112 and 114 to move to the cruising-favorite positions according to previously stored identifications in at least one storage memory.

In some embodiments, the cruising-favorite controller 262 may automatically control the actuators 116 and 118 to cause the trim tabs 112 and 114 to move to the cruising-favorite positions according to previously stored identifications in at least one storage memory independently of any measurement of angular position of the marine vessel, independently of any steering change of any angle of thrust of the marine vessel, or both.

In general, identifying, storing, and implementing cruising-favorite positions of the trim tabs 112 and 114 relative to the hull 102 and relative to the transom 108 automatically (for example, without specific user input indicating identifying, storing, or implementing such cruising-favorite positions) may facilitate control of at least one trim tab of a marine vessel, for example by adapting to changes in weight distribution or water condition automatically.

Holeshot Mode

In general, a rapid acceleration (for example, from stationary or from a low speed) may be referred to as a holeshot. During a holeshot of the marine vessel 100, engine thrust from the outboard motor 110 that is required for such rapid acceleration may cause the bow 104 to rise undesirably. Deploying the trim tabs 112 and 114 may mitigate such undesirable bow rise. Embodiments such as those described below may automatically (for example, without specific user input indicating moving the trim tabs 112 and 114) mitigate such undesirable bow rise.

Figure 28:
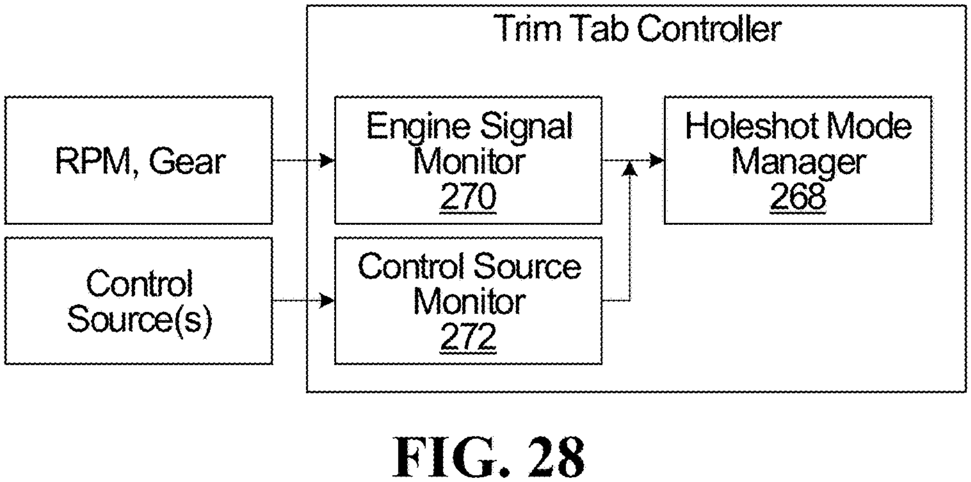
FIG. 28 is a schematic illustration of a trim-tab controller that may be implemented by the trim-tab controller of FIG. 10.
Figure 29:
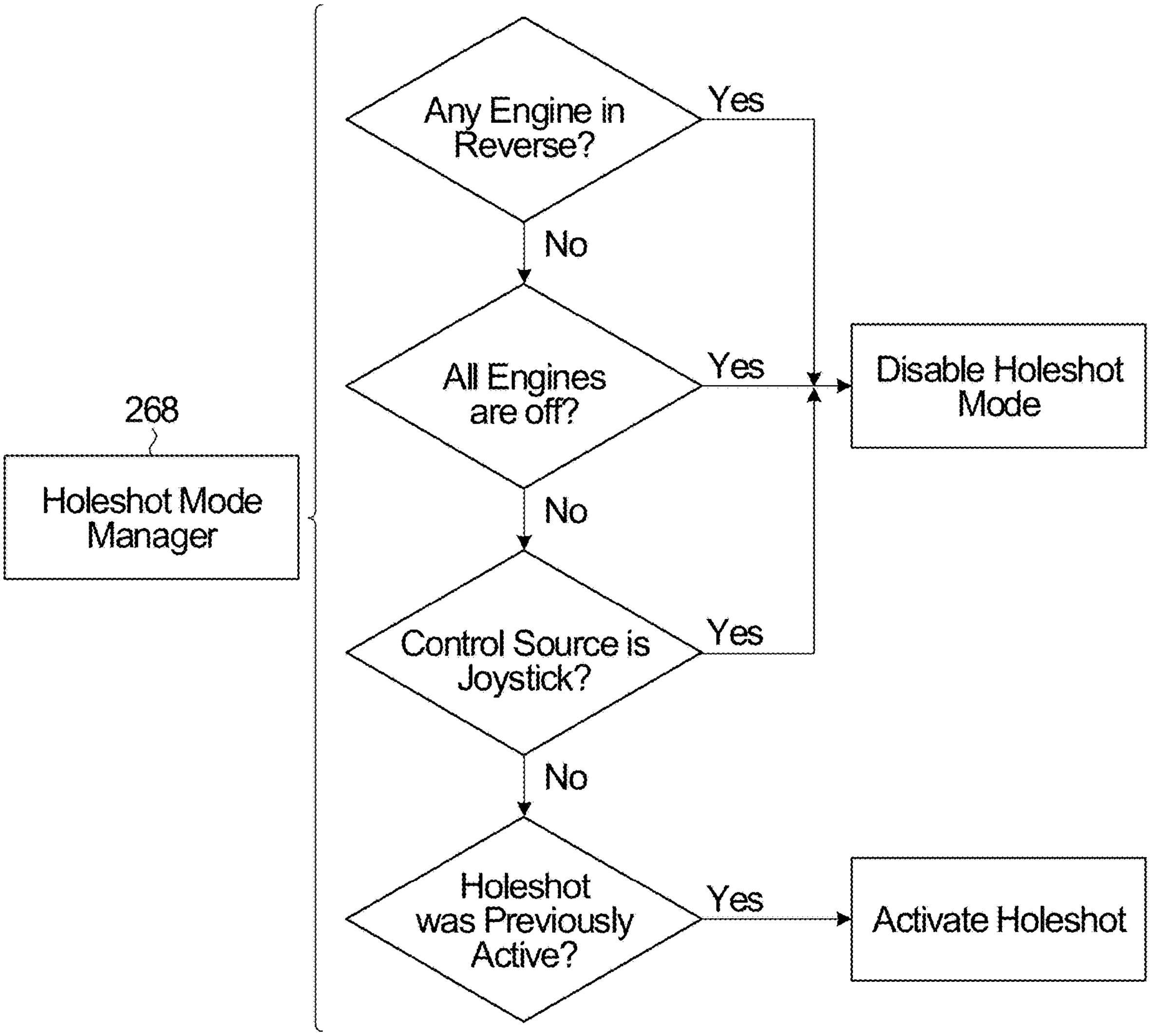
FIG. 29 is a schematic illustration of a method that may be implemented by the trim-tab controller of FIG. 28.

Referring to FIG. 28 and FIG. 29, in some embodiments, the trim-tab controller 186 may implement a holeshot-mode manager 268 that may determine whether the trim-tab controller 186 is in a holeshot mode. For example, one or more computer-readable and/or computer-writable storage media in the processor circuit 192 may store one or more storage codes representing whether the trim-tab controller 186 is in the holeshot mode.

As shown in FIG. 28, the holeshot-mode manager 268 may receive one or more signals from an engine-signal monitor 270, which may receive one or more signals representing a measured engine-rotation speed (or, more generally, measured engine output from at least one engine) of the outboard motor 110, for example in RPM, and for example from the engine-speed sensor 190. The engine-signal monitor 270 may also receive one or more signals representing a gear status of the outboard motor 110, for example indicating whether gears of the outboard motor 110 are configured to cause the outboard motor 110 to generate a forward thrust force, to generate a reverse thrust force, or to be in neutral without exerting a thrust force. The holeshot-mode manager 268 may receive one or more signals from a control-source monitor 272, which may receive one or more signals from one or more control sources (such as a joystick or a remote control system, for example).

Using one or more signals from the engine-signal monitor 270 and from the control-source monitor 272, the holeshot-mode manager 268 that may determine whether the trim-tab controller 186 is in the holeshot mode, and FIG. 29 illustrates a method that the holeshot-mode manager 268 may implement to determine whether the trim-tab controller 186 is in the holeshot mode. For example, one or more computer-readable storage media in the processor circuit 192 may store program codes that, when executed, cause the processor circuit 192 to implement the method of FIG. 29, in which case the processor circuit 192 may be programmed, configured, or operable to implement such functions.

As shown in FIG. 29, if 1. any engine of the marine vessel 100 is in reverse,
2. all engines of the marine vessel 100 are off, or
3. a control source of the marine vessel 100 is a joystick, then the holeshot mode may be disabled. Otherwise, if the holeshot mode was previously active, then the holeshot mode may be reactivated.

Of course the holeshot-mode manager 268 and the method of FIG. 29 are examples only, and alternative embodiments may differ. For example, in alternative embodiments, the holeshot mode may be disabled or reactivated in response to more, fewer, or different criteria. In some embodiments, for example, user actuation of the mode-selection button 140 may activate, disable, or reactivate the holeshot mode.

Also, in some embodiments, the status indicator 144 may indicate whether the holeshot mode is active.

Figure 30A:
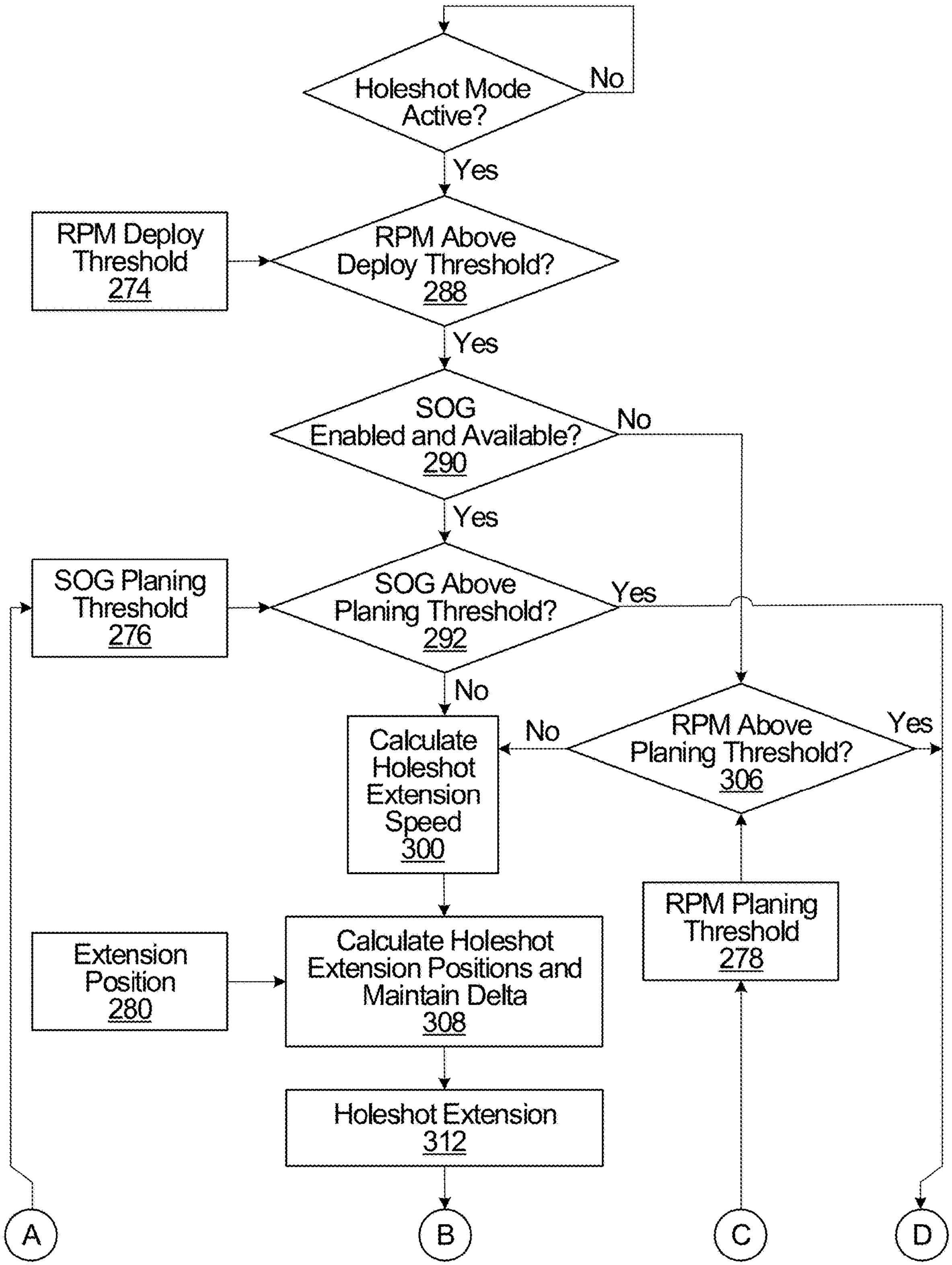
FIG. 30A and FIG. 30B are a schematic illustration of another method that may be implemented by the trim-tab controller of FIG. 28.
Figure 30B:
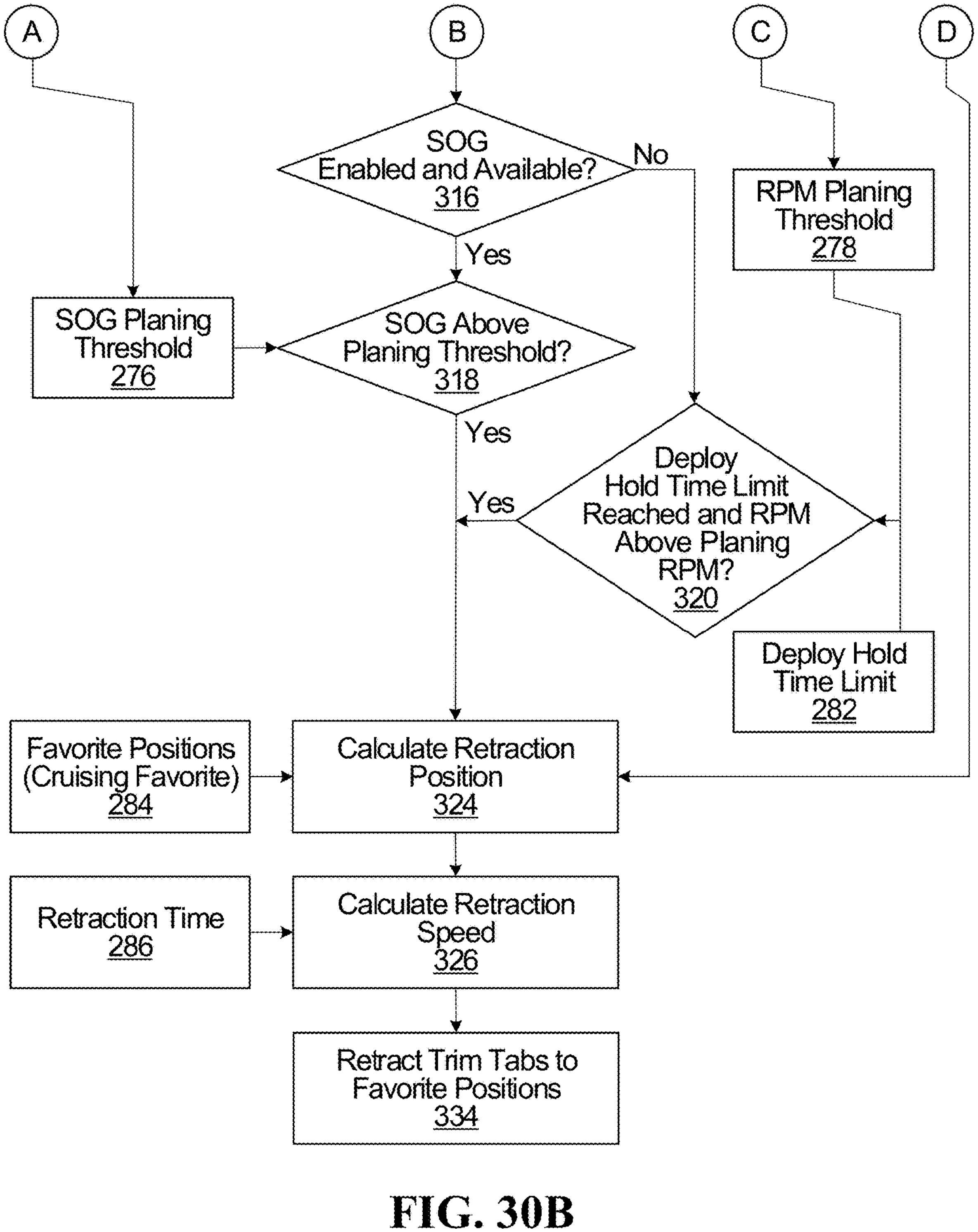

FIG. 30A and FIG. 30B illustrate a method that the holeshot-mode manager 268 may implement when the holeshot mode is active. For example, one or more computer-readable storage media in the processor circuit 192 may store program codes that, when executed, cause the processor circuit 192 to implement the method of FIG. 30A and FIG. 30B or other functions as described herein, for example, in which case the processor circuit 192 may be programmed, configured, or operable to implement such functions.

As shown in FIG. 30A and FIG. 30B, the method of FIG. 30A and FIG. 30B may involve particular predetermined or configured parameters, such as one or more of:

1. a begin-holeshot threshold, which may include a begin-holeshot threshold of measured engine output of at least one engine of the marine vessel 100, such as a threshold of measured engine-rotation speed of the at least one engine or an "RPM deploy threshold", which may be stored according to one or more storage codes 274 in one or more computer-readable and/or computer-writable storage media in the processor circuit 192;
2. a planing threshold of measured speed of the marine vessel, such as a threshold of measured SOG or an "SOG planing threshold", which may be stored according to one or more storage codes 276 in one or more computer-readable and/or computer-writable storage media in the processor circuit 192;
3. a planing threshold of measured engine output of at least one engine of the marine vessel 100, such as a threshold of measured engine-rotation speed of the at least one engine or an "RPM planing threshold", which may be stored according to one or more storage codes 278 in one or more computer-readable and/or computer-writable storage media in the processor circuit 192;
4. extension positions of the trim tabs 112 and 114 relative to the hull 102 and relative to the transom 108, which may be positions relative to the hull 102 and relative to the transom 108 to which the trim tabs 112 and 114 may be extended at the beginning of a holeshot, and which may be stored according to one or more storage codes 280 in one or more computer-readable and/or computer-writable storage media in the processor circuit 192;
5. a deploy time during which the trim tabs 112 and 114 may remain deployed during a holeshot, which may be stored according to one or more storage codes 282 in one or more computer-readable and/or computer-writable storage media in the processor circuit 192;
6. cruising-favorite positions of the trim tabs 112 and 114 relative to the hull 102 and relative to the transom 108, which may be identified according to the method of FIG. 27 as described above for example, and which may be stored according to one or more storage codes 284 in one or more computer-readable and/or computer-writable storage media in the processor circuit 192; and
7. retraction time, which may be a time during which the trim tabs 112 and 114 may be retracted after a holeshot, and which may be stored according to one or more storage codes 286 in one or more computer-readable and/or computer-writable storage media in the processor circuit 192.

In general, such parameters may be identified based on particular characteristics of the marine vessel 100, such as a planing speed of the hull 102, or known engine output required for planing of the marine vessel 100.

One or more computer-readable storage media in the processor circuit 192 may store blocks of program codes that, when executed, cause the processor circuit 192 to implement the method of FIG. 30A and FIG. 30B, in which case the processor circuit 192 may be programmed, configured, or operable to implement such functions.

When the holeshot mode is active, the method of FIG. 30A and FIG. 30B may begin at block 288, which may include program codes that, when executed, cause the trim-tab controller 186 to wait until a measured engine output of at least one engine of the marine vessel 100 (for example, a measured engine-rotation speed of the outboard motor 110, which may be according to one or more signals from the engine-signal monitor 270) is above the begin-holeshot threshold of engine output according to the one or more storage codes 274.

If at block 288 the measured engine output is above the begin-holeshot threshold of engine output, then the method of FIG. 30A and FIG. 30B may continue at block 290, which may include program codes that, when executed, cause the trim-tab controller 186 to determine whether measured SOG (for example, from the GPS sensor 188) is available.

If at block 290 the measured SOG is available, then the method of FIG. 30A and FIG. 30B may continue at block 292, which may include program codes that, when executed, cause the trim-tab controller 186 to determine whether the measured SOG is above the planing threshold of measured speed according to the one or more storage codes 276.

Figure 31:
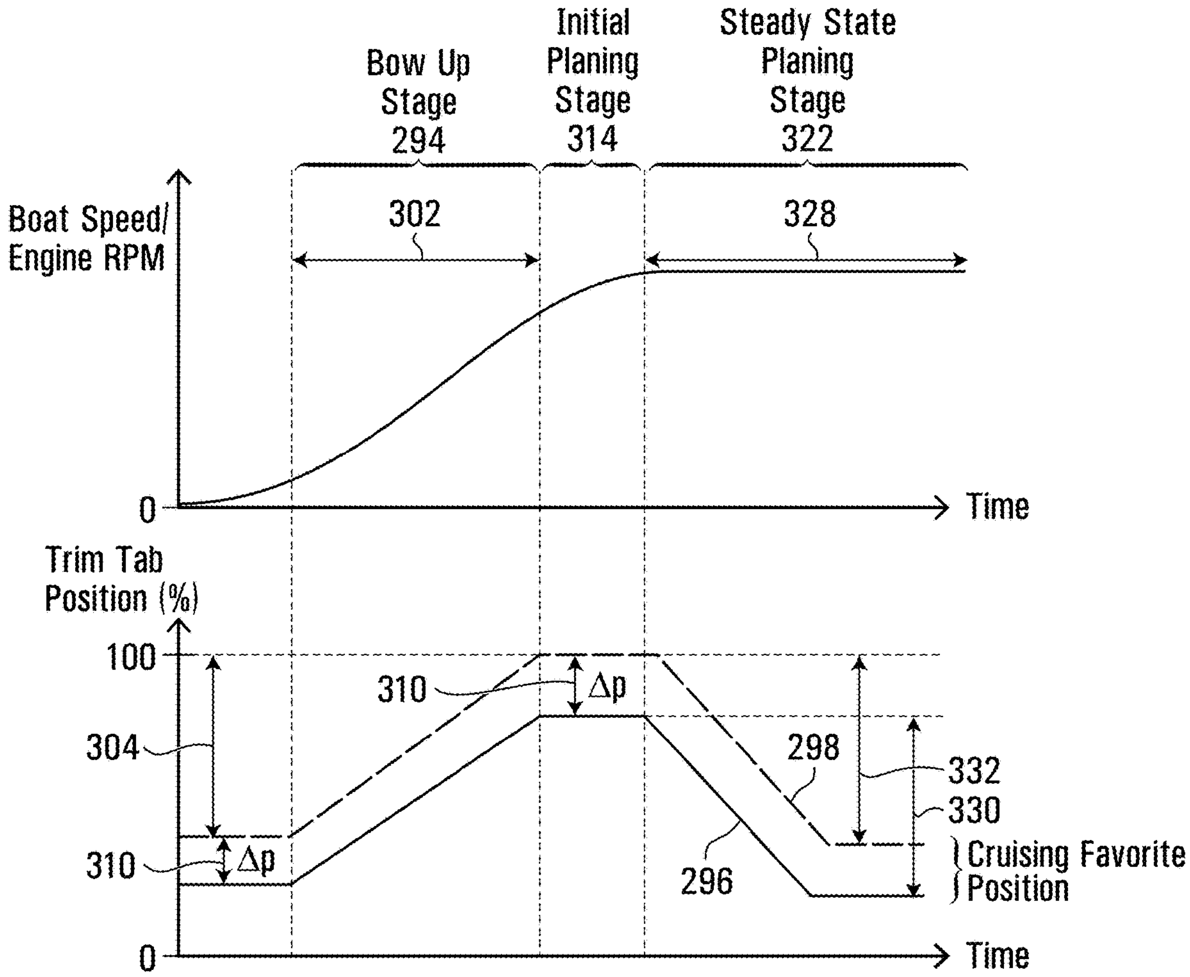
FIG. 31 and FIG. 32 illustrates another example of movement of trim tabs of the marine vessel of FIG. 1.

If at block 292 the measured SOG is not above the planing threshold of measured speed, then the measured engine-rotation speed of the outboard motor 110 is above the begin-holeshot threshold of engine output but measured SOG is not above the planing threshold of measured speed, so the high engine output relative to the SOG may cause the bow 104 to rise undesirably, and the marine vessel may be in a bow-up stage 294 as shown in FIG. 31. Deploying the trim tabs 112 and 114 may mitigate such undesirable bow rise.

FIG. 31 illustrates an example of movement of the trim tabs 112 and 114 relative to the hull 102 and relative to the transom 108 under control of the trim-tab controller 186 in the holeshot mode. In FIG. 31, a line 296 represents an amount of extension of the port trim tab 112 relative to the hull 102 and relative to the transom 108 over time as a percentage in a range from 0% (at the retracted end of a range of motion of the port trim tab 112) to 100% (at the extended end of the range of motion of the port trim tab 112), and a line 298 represents an amount of extension of the starboard trim tab 114 relative to the hull 102 and relative to the transom 108 over time as a percentage in a range from 0% (at the retracted end of a range of motion of the starboard trim tab 114) to 100% (at the extended end of the range of motion of the starboard trim tab 114).

If at block 290 measured SOG is not available, then the method of FIG. 30A and FIG. 30B may continue at block 306, which may include program codes that, when executed, cause the trim-tab controller 186 to determine whether measured engine-rotation speed (or, more generally, measured engine output from at least one engine) of the outboard motor 110 (or, more generally, one or more engines) is above the planing threshold of measured engine output (which may be stored according to one or more storage codes 278).

In general, the program codes at blocks 292 and 306 may identify whether the marine vessel 100 is not yet planing because either (at block 292) the measured SOG is not above the planing threshold of measured speed or (at block 306) the measured engine output is not above the planing threshold of measured engine output. Therefore, detection of the measured SOG not above the planing threshold of measured speed (at block 292) when the measured engine output is above a begin-holeshot threshold of engine output (at block 288) is an example of a begin-holeshot criterion, and detection of the measured engine output above a begin-holeshot threshold of engine output (at block 288) and not above the planing threshold of measured engine output (at block 306) is another example of a begin-holeshot criterion. In various embodiments, one or both of those begin-holeshot criteria, or one or more other begin-holeshot criteria, may initiate extension of one or both of the trim tabs 112 and 114 to mitigate undesirable bow rise.

Therefore, if at block 292 the measured SOG is not above the planing threshold of measured speed, or if at block 306 the engine output is not above the planing threshold, then the method of FIG. 30A and FIG. 30B may continue at block 300, which may include program codes that, when executed, cause the trim-tab controller 186 to calculate an extension speed at which the trim tabs 112 and 114 may extend. As shown in FIG. 31, the bow-up stage 294 has a duration of time 302 (which may be a predetermined trim-tab-extension time), and during the bow-up stage 294, the trim tabs 112 and 114 extend by an extension amount 304. The program codes at block 300 may, when executed, cause the trim-tab controller 186 to calculate the extension speed as the extension amount 304 divided by the duration of time 302.

Figure 32:
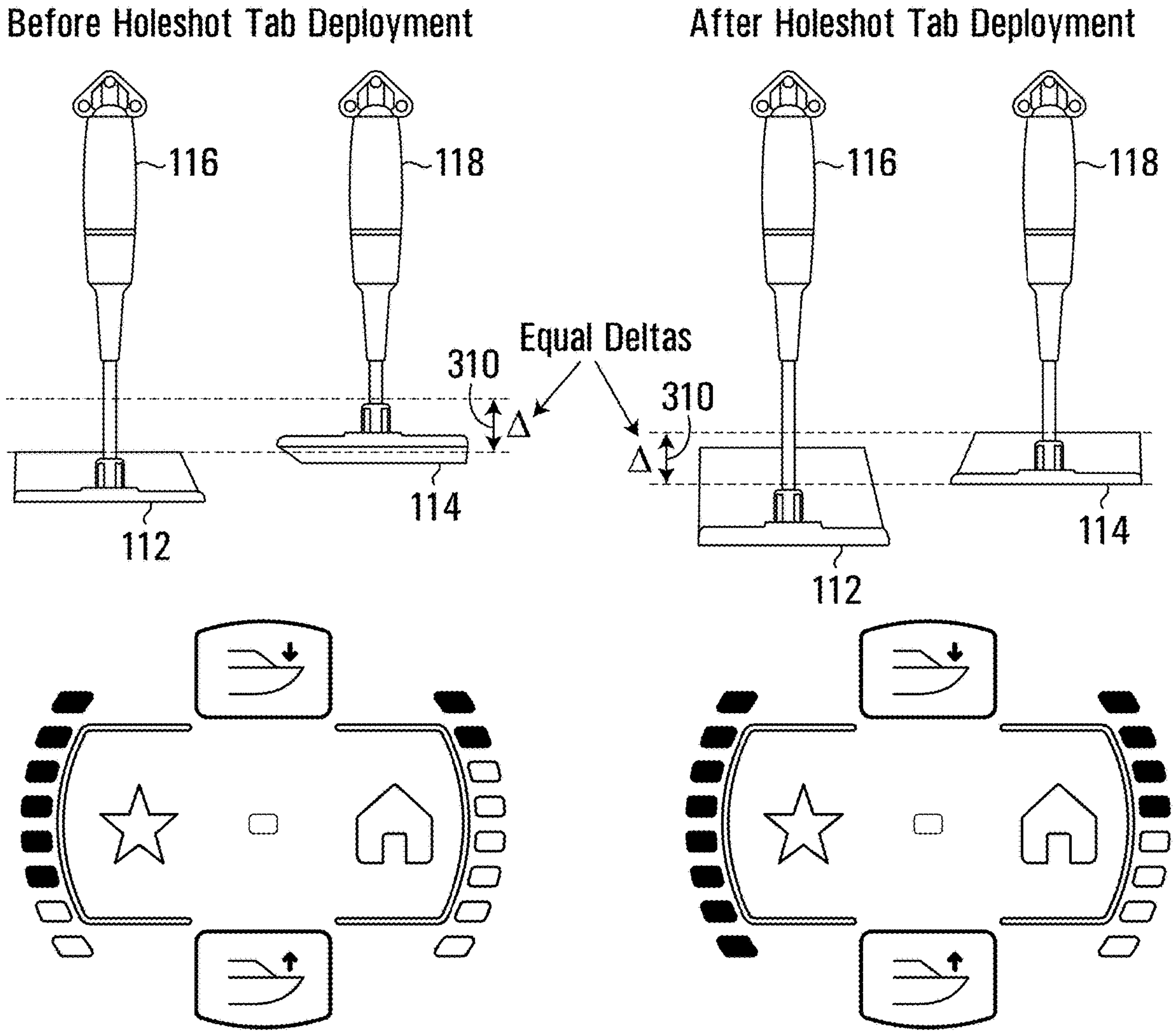

After block 300, the method of FIG. 30A and FIG. 30B may continue at block 308, which may include program codes that, when executed, cause the trim-tab controller 186 to calculate positions for a holeshot extension and control the actuators 116 and 118 to cause the trim tabs 112 and 114 to extend to the positions for the holeshot extension (which may be stored according to one or more storage codes 280) while maintaining a difference in extension Δp (or 310) of the trim tabs 112 and 114 as shown in FIG. 31 and FIG. 32. As in the examples of FIG. 15 to FIG. 17, and FIG. 24, the difference in extension Δp may have been chosen to correct a list of the marine vessel 100, or for some other reason, and maintaining the difference in extension Δp may prevent any undesired change in roll in response to extending the trim tabs 112 and 114 to the positions for the holeshot extension. However, alternative embodiments may differ, and such a difference in extension may not be maintained in some embodiments.

After block 308, the method of FIG. 30A and FIG. 30B may continue at block 312, which may include program codes that, when executed, cause the trim-tab controller 186 to maintain the trim tabs 112 and 114 in the positions for the holeshot extension during an initial planing stage 314 shown in in FIG. 31. Again, during the initial planing stage 314, the trim-tab controller 186 may control the actuators 116 and 118 to cause the trim tabs 112 and 114 to maintain the difference in extension Δp (or 310) of the trim tabs 112 and 114, as shown in FIG. 31 and FIG. 32, to prevent any undesired change in roll, although alternative embodiments may differ, and such a difference in extension may not be maintained in some embodiments.

After block 312, the method of FIG. 30A and FIG. 30B may continue at block 316, which may include program codes that, when executed, cause the trim-tab controller 186 to determine whether measured SOG (for example, from the GPS sensor 188) is available.

If at block 316 measured SOG is available, then the method of FIG. 30A and FIG. 30B may continue at block 318, which may include program codes that, when executed, cause the trim-tab controller 186 to wait until the measured SOG is above the planing threshold of measured speed according to the one or more storage codes 276.

If at block 316 measured SOG is not available, then the method of FIG. 30A and FIG. 30B may continue at block 320, which may include program codes that, when executed, cause the trim-tab controller 186 to wait until 1. measured engine-rotation speed (or, more generally, measured engine output from at least one engine) of the outboard motor 110 (or, more generally, one or more engines) is above the planing threshold of measured engine output (which may be stored according to one or more storage codes 278), and
2. the deploy time (which may be stored according to one or more storage codes 282) since the trim tabs 112 and 114 were extended following the bow-up stage 294 has elapsed.

If at block 318 the measured SOG is above the planing threshold of measured speed, or if at block 320 the measured engine output is above the planing threshold of measured engine output and the deploy time since the trim tabs 112 and 114 were extended following the bow-up stage 294 has elapsed, then the marine vessel may be in a steady-state (or stable) planing stage 322 as shown in FIG. 31, and the trim-tab controller 186 may control the controls the actuators 116 and 118 to cause the trim tabs 112 and 114 to be positioned in the cruising-favorite positions as described above.

In general, the program codes at blocks 318 and 320 may detect whether the marine vessel 100 is in a steady-state (or stable) planing stage because either (at block 318) the measured SOG is above the planing threshold of measured speed or (at block 320) the measured engine output is above the planing threshold of measured engine output. Therefore, detection of the measured SOG above the planing threshold of measured speed (at block 318) is an example of a stable-planing criterion, and detection of the measured engine output above the planing threshold of measured engine output (at block 320) is another example of a stable-planing criterion. In various embodiments, one or both of those stable-planing criteria, or one or more other stable-planing criteria, may initiate retraction of one or both of the trim tabs 112 and 114, for example to cruising-favorite positions according to previously stored identifications in at least one storage memory. Further, if at block 292 the measured SOG is above the planing threshold of measured speed, or if at block 306 the engine output is above the planing threshold, then the marine vessel 100 is also in the steady-state (or stable) planing stage.

Therefore, if at block 292 the measured SOG is above the planing threshold of measured speed, or if at block 306 the engine output is above the planing threshold, or when at block 318 the measured SOG is above the planing threshold, or when at block 320 the engine output is above the planing threshold and the deploy time since the trim tabs 112 and 114 were extended following the bow-up stage 294 has elapsed, the method of FIG. 30A and FIG. 30B may continue at block 324, which may include program codes that, when executed, cause the trim-tab controller 186 to calculate the cruising-favorite positions (which may be stored according to one or more storage codes 284) of the trim tabs 112 and 114.

After block 324, the method of FIG. 30A and FIG. 30B may continue at block 326, which may include program codes that, when executed, cause the trim-tab controller 186 to calculate respective retraction speeds at which the trim tabs 112 and 114 may retract. As shown in FIG. 31, the steady-state planing stage 322 has a duration of time 328 (which may be a predetermined retraction time), and during the steady-state planing stage 322, the port trim tab 112 may retract by a retraction amount 330, and the starboard trim tab 114 may retract by a retraction amount 332. The retraction amounts 330 and 332 may be determined to cause the trim tabs 112 and 114 to be positioned in the cruising-favorite positions (which may be stored according to one or more storage codes 284), and the retraction amounts 330 and 332 may differ from each other if a difference in extension of the trim tabs 112 and 114 in the cruising-favorite positions differs from the difference in extension $\Delta p$ (or 310). The program codes at block 324 may, when executed, cause the trim-tab controller 186 to calculate a retraction speed for the port trim tab 112 as the retraction amount 330 divided by the duration of time 328, and to calculate a retraction speed for the starboard trim tab 114 as the retraction amount 332 divided by the duration of time 328.

After block 326, the method of FIG. 30A and FIG. 30B may continue at block 334, which may include program codes that, when executed, cause the trim-tab controller 186 to control the actuators 116 and 118 to cause the trim tabs 112 and 114 to be positioned in the cruising-favorite positions as described above.

In some embodiments, the method of FIG. 30A and FIG. 30B may be SOG-based (if the method involves blocks 292 and 318) or RPM-based (if the method involves blocks 306 and 320). In such embodiments, the status indicator 144 may indicate whether the holeshot mode is SOG-based or RPM-based. Of course other embodiments may differ, and may be always SOG-based, always RPM-based, or different still.

In summary, the embodiments described above may involve deploying trim tabs automatically (for example, without specific user input indicating deploying the trim tabs 112 and 114) in response to one or more begin-holeshot criteria, and may involve retracting trim tabs automatically (for example, without specific user input indicating retracting the trim tabs 112 and 114) in response to one or more stable-planing criteria, for example to cruising-favorite positions according to previously stored identifications in at least one storage memory.

Summary

In general, embodiments such as those described above may facilitate controlling at least one trim tab of a marine vessel intuitively and independently of any measurement of angular position (such as pitch, roll, or both) of the marine vessel, which may avoid additional cost of sensors of angular position of the marine vessel.

Although specific embodiments have been described and illustrated, such embodiments should be considered illustrative only and not as limiting the invention as construed according to the accompanying claims.

The invention claimed is:

1. A method of controlling at least two trim tabs of a marine vessel, the method comprising:
 in response to at least one user input indicating an amount of change of pitch of the marine vessel, causing movement of the at least two trim tabs relative to a hull of the marine vessel, wherein causing the movement of the at least two trim tabs comprises causing a difference in extension of the at least two trim tabs relative to the hull to be maintained; and
 in response to one of the at least two trim tabs reaching an end of a range of motion relative to the hull of the one of the at least two trim tabs, and in response to the at least one user input persisting for at least a predetermined period of time after the one of the at least two trim tabs reached the end of the range of motion, causing the difference in extension of the at least two trim tabs relative to the hull to be reduced.

2. The method of claim 1 wherein the at least one user input is a single user input.

3. The method of claim 1 wherein the end of the range of motion is an end of possible motion of the one of the at least two trim tabs relative to the hull.

4. The method of claim 1 wherein the end of the range of motion is configured.

5. A trim-tab controller for controlling at least two trim tabs of a marine vessel, the trim-tab controller comprising:
 at least one processor circuit operable to, at least:
 in response to a user input indicating an amount of change of pitch of the marine vessel, cause movement of the at least two trim tabs relative to a hull of the marine vessel such that a difference in extension of the at least two trim tabs relative to the hull is maintained; and in response to one of the at least two trim tabs reaching an end of a range of motion relative to the hull of the one of the at least two trim tabs, and in response to the user input persisting for at least a predetermined period of time after the one of the at least two trim tabs reached the end of the range of motion, cause the difference in extension of the at least two trim tabs relative to the hull to be reduced.

6. The trim-tab controller of claim 5 wherein when the user input indicates a decrease in pitch of the marine vessel, the movement of the at least one trim tab comprises retracting the at least two trim tabs relative to the hull.

7. The trim-tab controller of claim 5 wherein when the user input indicates an increase in pitch of the marine vessel, the movement of the at least one trim tab comprises extending the at least two trim tabs relative to the hull.

8. The trim-tab controller of claim 5 wherein the end of the range of motion is an end of possible motion of the one of the at least two trim tabs relative to the hull.

9. The trim-tab controller of claim 5 wherein the end of the range of motion is configured.

10. The trim-tab controller of claim 5 further comprising a trim-tab-input device, wherein the user input is user input using the trim-tab-input device.

11. The trim-tab controller of claim 10 wherein the trim-tab-input device comprises a button, and the user input comprises user actuation of the button.

12. The trim-tab controller of claim 11 wherein the button is on a graphical user interface of the trim-tab-input device.

13. The trim-tab controller of claim 12 wherein the trim-tab-input device is a mobile handheld device, and the graphical user interface is on the mobile handheld device.

14. The trim-tab controller of claim 12 wherein the trim-tab-input device comprises a multi-function display, and the graphical user interface is on the multi-function display.

15. The trim-tab controller of claim 5 wherein the user input is a single user input.

16. The trim-tab controller of claim 5 wherein the at least one processor circuit is operable to cause the movement of the at least two trim tabs by an amount proportionate to a duration of the user input.

17. The trim-tab controller of claim 5 wherein the at least one processor circuit is operable to cause the movement of the at least two trim tabs independently of any measurement of angular position of the marine vessel.

18. The trim-tab controller of claim 5 wherein the at least one processor circuit is operable to cause the movement of the at least two trim tabs independently of any steering change of any angle of thrust of the marine vessel.

19. A trim-tab system comprising:

the trim-tab controller of claim 5; and the at least two trim tabs.

20. A marine vessel comprising:

the trim-tab controller of claim 5; and the at least two trim tabs.

* * * * *